(12) United States Patent
Weber et al.

(10) Patent No.: US 12,001,803 B2
(45) Date of Patent: Jun. 4, 2024

(54) SYSTEM AND STROKE DATA PROCESSING METHOD

(71) Applicant: Wacom Co., Ltd., Saitama (JP)

(72) Inventors: Markus Weber, Duesseldorf (DE); Philipp Daniel Schongen, Duesseldorf (DE); Joss Daniel Giffard-Burley, Frome (GB); Avinav Khanal, Duesseldorf (DE)

(73) Assignee: Wacom Co., Ltd., Saitama (JP)

( * ) Notice: Subject to any disclaimer, the term of this patent is extended or adjusted under 35 U.S.C. 154(b) by 257 days.

(21) Appl. No.: 17/529,955

(22) Filed: Nov. 18, 2021

(65) Prior Publication Data
US 2022/0075957 A1 Mar. 10, 2022

Related U.S. Application Data

(63) Continuation of application No. PCT/JP2020/019686, filed on May 18, 2020.

(30) Foreign Application Priority Data

May 20, 2019 (JP) .................................. 2019-094890
May 20, 2019 (JP) .................................. 2019-094891

(51) Int. Cl.
*G06F 40/30* (2020.01)
*G06F 3/04883* (2022.01)
(Continued)

(52) U.S. Cl.
CPC .......... *G06F 40/30* (2020.01); *G06F 3/04883* (2013.01); *G10L 15/1815* (2013.01); *G10L 2015/223* (2013.01)

(58) Field of Classification Search
CPC .... G06F 40/171; G06F 40/30; G06F 3/04883; G06F 2200/1632; G06F 3/03545;
(Continued)

(56) References Cited

U.S. PATENT DOCUMENTS 7,499,047 B2 * 3/2009 Silverman ........... G06F 3/04883
358/1.9
9,384,732 B2 7/2016 Bishop et al.
(Continued)

FOREIGN PATENT DOCUMENTS

JP 2010-198076 A 9/2010
JP 2011-60287 A 3/2011
(Continued)

OTHER PUBLICATIONS

International Search Report dated Jun. 16, 2015, for the corresponding International Patent Application No. PCT/JP2015/060076, 2 pages.
(Continued)

*Primary Examiner* — Vijay B Chawan
(74) *Attorney, Agent, or Firm* — Seed IP Law Group LLP

(57) ABSTRACT

A system and a method are provided to facilitate a search of information indicated by stroke data. A system includes a processor. The processor obtains stroke data generated in response to handwriting input and generates, by performing semantic analysis on the stroke data, semantic metadata including semantic data indicating semantics of the stroke data and purpose data determined based on the semantic data.

12 Claims, 19 Drawing Sheets

(51) Int. Cl.
*G10L 15/18* (2013.01)
*G10L 15/22* (2006.01)

(58) Field of Classification Search
CPC .......... G10L 15/1815; G10L 2015/223; G06V 30/10; G06V 20/19173
See application file for complete search history.

(56) References Cited

U.S. PATENT DOCUMENTS

| | | | | |
|---|---|---|---|---|
| 10,339,372 | B2* | 7/2019 | Mikutel | G06V 30/347 |
| 11,087,078 | B2* | 8/2021 | Swamy | G06F 40/171 |
| 11,474,688 | B2* | 10/2022 | Kim | G06F 3/03545 |
| 11,526,659 | B2* | 12/2022 | Cottle | G06F 3/04883 |
| 2005/0044295 | A1* | 2/2005 | Wakeam | G06V 30/414 |
| | | | | 710/72 |
| 2008/0210475 | A1* | 9/2008 | Silverman | G06F 9/451 |
| | | | | 178/19.01 |
| 2008/0235564 | A1* | 9/2008 | Erol | G06F 16/9577 |
| | | | | 715/202 |
| 2015/0058718 | A1* | 2/2015 | Kim | G06V 30/32 |
| | | | | 715/268 |
| 2016/0292500 | A1 | 10/2016 | Angelov et al. | |
| 2017/0068436 | A1* | 3/2017 | Auer | G06F 3/04883 |
| 2017/0068854 | A1* | 3/2017 | Markiewicz | G06V 30/36 |
| 2018/0300541 | A1* | 10/2018 | Mikutel | G06V 30/2268 |

FOREIGN PATENT DOCUMENTS

| | | |
|---|---|---|
| WO | 2016/157400 A1 | 10/2016 |
| WO | 2017/040230 A1 | 3/2017 |

OTHER PUBLICATIONS

International Search Report dated Jul. 7, 2020, for the corresponding International Patent Application No. PCT/JP2020/019686, 2 pages.
Minh Tue Vo et al., "Building an Application Framework for Speech and Pen Input Integration in Multimodal Learning Interfaces," XP002935085, *Interactive Systems Laboratories*, Carnegie Mellon University, Pittsburgh, PA, 4 pages.
Partial Supplementary European Search Report, dated Jun. 10, 2022, for European Application No. 20810357.2-1207 / 3975532, 15 pages.

* cited by examiner

FIG. 3A

| SPEECH INFORMATION | CONTENTS OF OPERATION TO BE ACTIVATED | APPLICATION TO BE ACTIVATED |
|---|---|---|
| Write E-mail | ACTIVATE APPLICATION | E-MAIL APPLICATION |
| What is on my *? | PRESENT INK FILE | - |
| ⋮ | ⋮ | ⋮ |

FIG. 3B

| SPEECH INFORMATION | | ACTIVATION MODE |
|---|---|---|
| With pen | Pen is unlimited | UNLIMITED HANDWRITING INPUT MODE |
| With pen | - | SPEAKER'S HANDWRITING INPUT MODE |
| With keyboard | - | KEYBOARD INPUT MODE |
| - | Pen is unlimited | UNLIMITED HANDWRITING INPUT MODE |
| - | - | SPEAKER'S HANDWRITING INPUT MODE |

FIG. 3C

| SPEECH INFORMATION | SETTING DATA |
|---|---|
| (To) * | RECIPIENT |
| SPEAKER | SENDER |
| ⋮ | ⋮ |

FIG. 4

| USER NAME | PEN ID |
|---|---|
| TOM | 0001 |
| JOHN | 0002 |
| ⋮ | ⋮ |

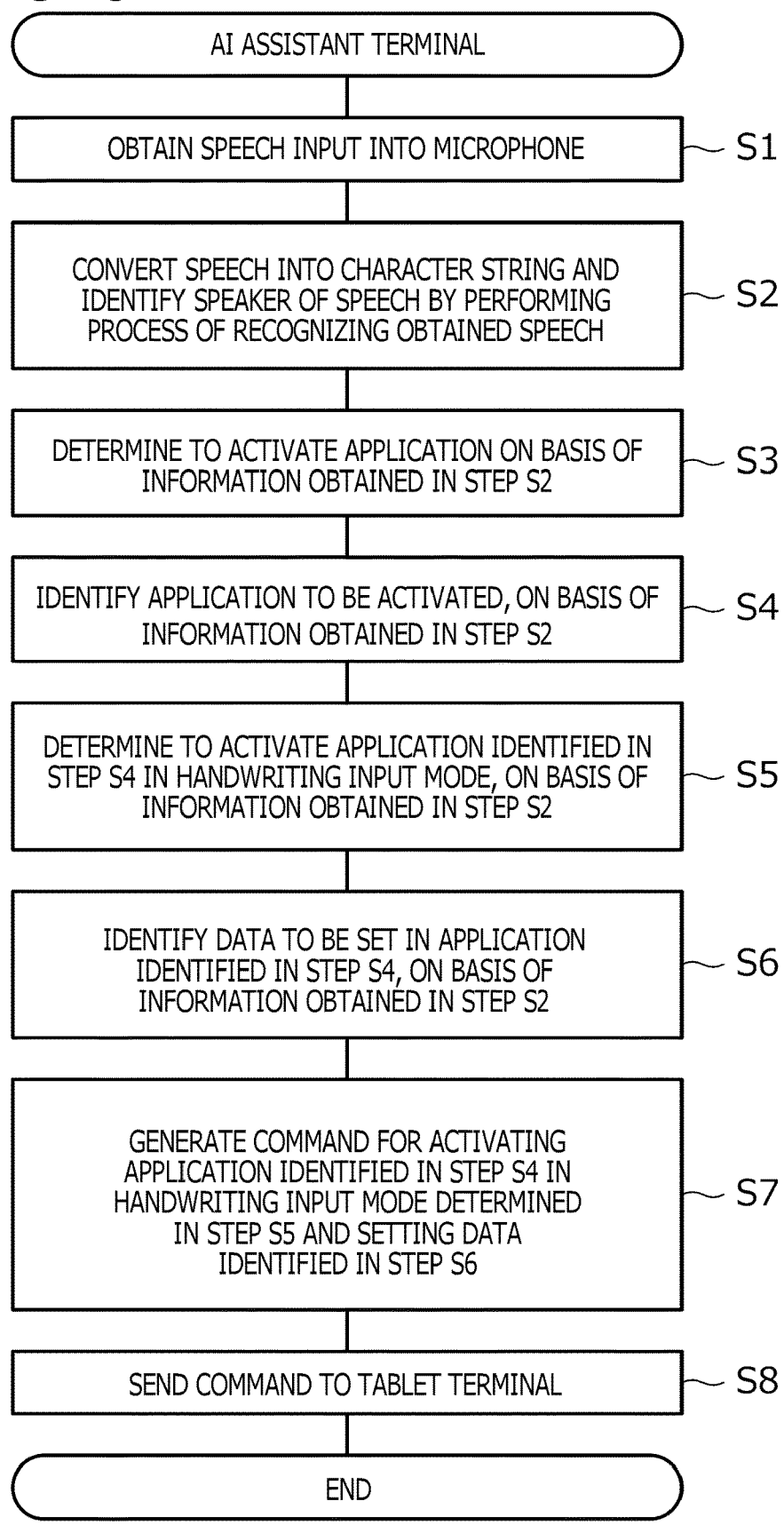

FIG. 15

| INK FILE | SEMANTIC METADATA | PEN ID |
|---|---|---|
| INK FILE 01 | SEMANTIC METADATA 01 | 0001 |
| INK FILE 02 | SEMANTIC METADATA 02 | 0002 |
| INK FILE 03 | SEMANTIC METADATA 03 | 0001 |
| ⋮ | ⋮ | ⋮ |

FIG. 16A

| SPEECH INFORMATION | CONTENTS OF OPERATION TO BE ACTIVATED | APPLICATION TO BE ACTIVATED |
|---|---|---|
| Write E-mail | ACTIVATE APPLICATION | E-MAIL APPLICATION |
| What is on my *? | PRESENT INK FILE | - |
| ⋮ | ⋮ | ⋮ |

FIG. 16B

| SPEECH INFORMATION | TYPE OF INK FILE TO BE PRESENTED |
|---|---|
| Shopping list | SHOPPING LIST |
| ToDo List | To-Do LIST |
| ⋮ | ⋮ |

SYSTEM AND STROKE DATA PROCESSING METHOD

TECHNICAL FIELD

The present invention relates to a stroke data processing system and a stroke data processing method.

BACKGROUND ART

An ink file including stroke data generated by handwriting input operation is known. The use of the ink file allows the reproduction of how handwriting has been performed, by reproducing the stroke data included in the ink file.

Patent Document 1 discloses an example of the ink file. The ink file according to this example includes metadata that identifies an input device used for handwriting input. The metadata is used to perform a process of decoding or reproducing stroke data according to each different input device.

Further, in recent years, AI (Artificial Intelligence) assistants have been attracting attention. The AI assistants perform tasks and services on the basis of speech commands and are implemented by a variety of smart devices, such as smartphones, tablet terminals, and smart speakers, which have become increasingly popular in recent years. Patent Document 2 discloses an example of the AI assistant.

PRIOR ART DOCUMENT

Patent Documents

Patent Document 1: PCT Patent Publication No. WO 2016/157400

Patent Document 2: U.S. Pat. No. 9,384,732

SUMMARY OF INVENTION

Technical Problem

Incidentally, searching for information indicated by stroke data included in an ink file is laborious work. Therefore, there is a need for a technique that can facilitate a search of information indicated by stroke data.

Therefore, one of objects of the present invention is to provide a system and a method that can facilitate a search of information indicated by stroke data.

Technical Solution

A system according to the present invention is a system including a processor, in which the processor obtains stroke data generated in response to handwriting input and generates, by performing semantic analysis on the stroke data, semantic metadata including semantic data indicating semantics of the stroke data and purpose data determined based on the semantic data.

A method according to the present invention is a stroke data processing method including generating stroke data in response to handwriting input and generating, by performing semantic analysis on the generated stroke data, semantic metadata including semantic data indicating semantics of the stroke data and purpose data determined based on the semantic data.

Advantageous Effect

According to the present invention, a search of information indicated by stroke data is enabled.

BRIEF DESCRIPTION OF DRAWINGS

FIGS. 3A to 3C are diagrams each illustrating a table stored in advance in a memory 12 of the AI assistant terminal 10 illustrated in FIG. 2.

FIG. 4 is a diagram illustrating a user table stored in a memory 22 of the tablet terminal 20 illustrated in FIG. 2.

FIG. 5 is a processing flow diagram illustrating processing performed by a processor 11 of the AI assistant terminal 10 illustrated in FIG. 2.

FIG. 7A is a diagram illustrating an example of a command generated in step S7 illustrated in FIG. 5 with regard to the example illustrated in FIG. 6, while

FIG. 15 is a diagram illustrating an ink file database stored in the memory 12 of the AI assistant terminal 10 illustrated in FIG. 14.

FIGS. 16A and 16B are diagrams each illustrating a table stored in advance in the memory 12 of the AI assistant terminal 10 illustrated in FIG. 14.

FIG. 20A is a diagram illustrating a result of grouping, in step S31 illustrated in FIG. 19, an ink file with regard to the example illustrated in FIG. 18, while

FIG. 21A is a diagram illustrating a result of grouping, in step S31 illustrated in FIG. 19, an ink file with regard to another example, while

MODES FOR CARRYING OUT THE INVENTION

Hereinafter, embodiments of the present invention will be described in detail with reference to the accompanying drawings.

Figure 1:
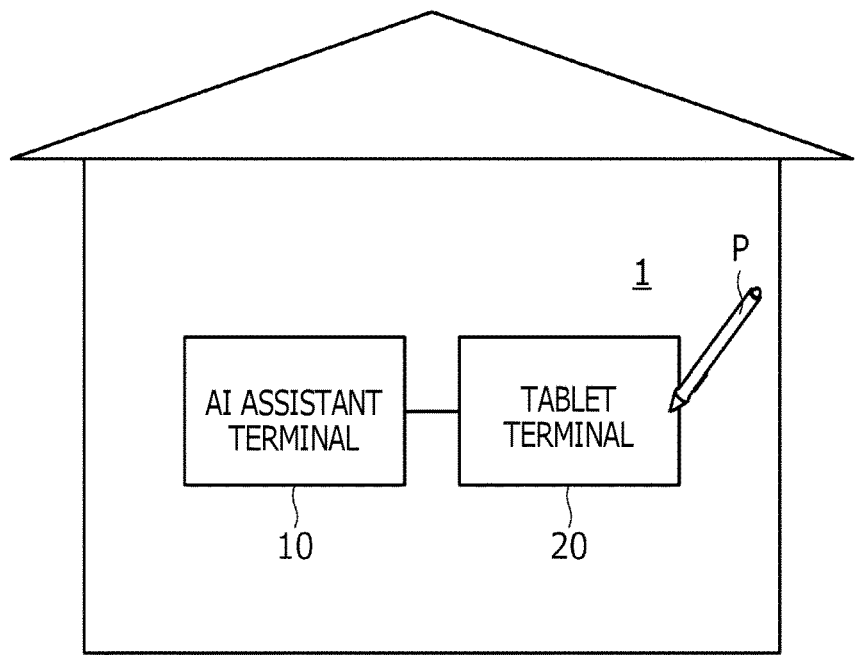
FIG. 1 is a diagram illustrating a configuration of a system 1 according to a first embodiment of the present invention.

FIG. 1 is a diagram illustrating a configuration of a system 1 according to a first embodiment of the present invention. As illustrated in the figure, the system 1 is a system installed in a home, for example, and includes an AI assistant terminal 10, a tablet terminal 20, and an electronic pen P.

The AI assistant terminal 10 is a computer that responds to speech input and executes a task or a service in response to a command based on the input speech (hereinafter referred to as a "speech command"). Specifically, it is preferable to use a smart speaker, which has been attracting attention in recent years, as the AI assistant terminal 10. The tablet terminal 20 is a computer configured to be able to respond to touch input with the electronic pen P or a finger and execute various applications such as a messaging application. The AI assistant terminal 10 and the tablet terminal 20 are connected to each other by wire or wirelessly, constituting the system 1 according to the present embodiment.

Figure 2:
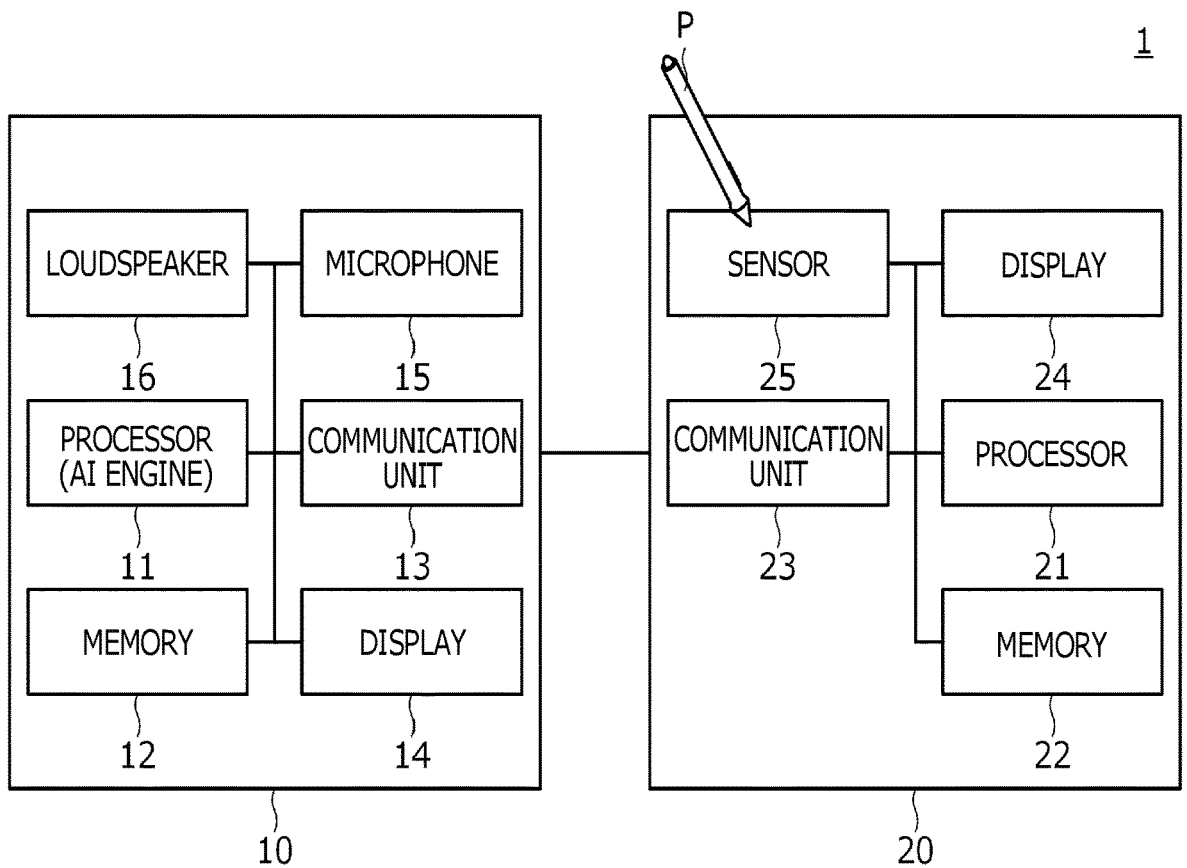
FIG. 2 is a schematic block diagram illustrating a hardware configuration of each of an AI assistant terminal 10 and a tablet terminal 20 illustrated in FIG. 1.

FIG. 2 is a schematic block diagram illustrating a hardware configuration of each of the AI assistant terminal 10 and the tablet terminal 20. Hereinafter, the configuration of each of the AI assistant terminal 10 and the tablet terminal 20 will be described in detail with reference to FIG. 2.

Focusing first on the AI assistant terminal 10, as illustrated in FIG. 2, the AI assistant terminal 10 has a configuration in which a processor 11, a memory 12, a communication unit 13, a display 14, a microphone 15, and a loudspeaker 16 are connected to each other via an internal bus.

The processor 11 is a central processing unit that controls each unit of the AI assistant terminal 10 and has functions of reading and executing programs stored in the memory 12. The programs executed by the processor 11 include an AI engine that performs processing related to speech input, such as a speech recognition process described later. By the AI engine recognizing the speech input through the microphone 15, the processor 11 plays a role in generating a command for activating an application in a handwriting input mode.

The memory 12 is a storage device configured to be able to store various programs and pieces of data. In a typical example, the memory 12 includes a main storage device such as an LPDDR SDRAM (Low Power Double Data Rate Synchronous Dynamic Random Access Memory) and an auxiliary storage device such as a flash memory or an SSD (Solid State Drive).

In the memory 12, data associating a speech feature with a character string and data associating a speech feature with speaker name data (hereinafter referred to as a "user name") are stored in advance by, for example, machine learning. By referring to these pieces of data, the AI engine performs the speech recognition process for converting input speech into a character string and a speaker recognition process for identifying the speaker (user name) of the input speech.

FIGS. 3A to 3C are diagrams each illustrating a table stored in the memory 12 in advance. FIG. 3A illustrates an operation contents table in which speech information, the contents of the operation to be activated, and the application to be activated are associated with each other. It is noted that the speech information refers to any of various pieces of information corresponding to results of the recognition processes performed by the AI engine. Examples of the speech information include a character string indicating the speech, the speaker who has uttered the speech, and the like.

The processor 11 is configured to determine the contents of the operation to be activated and the application to be activated on the basis of the information obtained as a result of the AI engine performing the process of recognizing the input speech and the speech information stored in the operation contents table. For example, when "Write Email" is included in the character string obtained as a result of the speech recognition process, the processor 11 determines to activate an e-mail application. Further, when "What is on my * ?" (* represents any character string) is included in the character string obtained as a result of the speech recognition process, the processor 11 determines to present an ink file. In the present embodiment, the former case, that is, the activation of the e-mail application will be described in detail. The latter case, that is, the presentation of an ink file, will be described in detail in a second embodiment.

FIG. 3B illustrates an activation mode table in which speech information is associated with an activation mode in a case where the e-mail application is activated. It is noted that, although only the activation mode table for the e-mail application is illustrated in this figure, it is preferable to provide a similar activation mode table for each application.

When the processor 11 determines to activate the e-mail application according to the table illustrated in FIG. 3A, the processor 11 determines the activation mode of the e-mail application by referring to FIG. 3B from top to bottom. Here, as illustrated in FIG. 3B, at least three activation modes are available for the e-mail application. The first activation mode is an unlimited handwriting input mode in which any electronic pen P or a finger can be used for input. The second activation mode is a speaker's handwriting input mode in which the electronic pen P of the speaker who has uttered the input speech can be used for input. Input with another electronic pen P or a finger is not allowed. The third activation mode is a keyboard input mode in which a virtual keyboard displayed on a display surface of the tablet terminal 20 or an external physical keyboard attached to the tablet terminal 20 can be used for input.

In the example illustrated in FIG. 3B, the processor 11 first determines whether or not a character string "With pen" and a character string "Pen is unlimited" are included in the character string obtained as a result of the speech recognition process. When the processor 11 determines that these character strings are included, the processor 11 determines to activate the e-mail application in the unlimited handwriting input mode. On the other hand, when the processor 11 determines that these character strings are not included, the processor 11 next determines whether or not the character string "With pen" is included in the character string obtained as a result of the speech recognition process. When the processor 11 determines that this character string is included, the processor 11 determines to activate the e-mail application in the speaker's handwriting input mode. After that, the processor 11 repeats the determination in a similar manner to determine the activation mode of the e-mail application. Finally, if none of "With pen," "Pen is unlimited," and "With keyboard" is included in the character string obtained as a result of the speech recognition process, the processor 11 determines to activate the e-mail application in the speaker's handwriting input mode.

It is noted that, although, in the example given in the present embodiment, the "unlimited handwriting input mode" is distinguished from the "speaker's handwriting input mode," the "unlimited handwriting input mode" and the "speaker's handwriting input mode" may be treated simply as the "handwriting input mode" without any particular distinction between them. Further, when "Write Email" is included in the character string obtained as a result of the speech recognition process, the e-mail application may be activated in the "handwriting input mode" without using the activation mode table illustrated in FIG. 3B.

FIG. 3C illustrates a setting data table in which speech information is associated with setting data used in the case where the e-mail application is activated. It is noted that, although only the setting data table for the e-mail application is illustrated in this figure, it is preferable to provide a similar setting data table for each application.

When the processor 11 activates the e-mail application according to the table illustrated in FIG. 3A, the processor 11 determines the setting data by referring to FIG. 3C. For example, when a character string "To *" is included in the character string obtained as a result of the speech recognition process, the processor 11 determines the character string included in the "*" part as the recipient in the e-mail application. Further, the processor 11 determines the user name of the speaker obtained as a result of the speaker recognition process as the sender in the e-mail application.

Returning to FIG. 2, the communication unit 13 is a functional unit for communicating with other computers via a network such as the Internet or in a peer-to-peer manner. Specifically, the communication unit 13 is configured to be communicable with other computers using one or more of various communication standards such as a wireless LAN (Local Area Network), Bluetooth (registered trademark), and Ethernet (registered trademark).

The display 14 is a display device configured to be able to display various images as indicated by the processor 11 and typically includes a liquid crystal display or an organic EL (Electroluminescent) display. The microphone 15 is a speech input device that converts speech coming from the outside into a digital signal and supplies the digital signal to the processor 11. The loudspeaker 16 is a speech output device that converts an electrical signal supplied from the processor 11 into speech and outputs the speech.

Next, focusing on the tablet terminal 20, as illustrated in FIG. 2, the tablet terminal 20 has a configuration in which a processor 21, a memory 22, a communication unit 23, a display 24, and a sensor 25 are connected to each other via an internal bus.

The processor 21 is a central processing unit that controls each unit of the tablet terminal 20 and has functions of reading and executing programs stored in the memory 22. The programs executed by the processor 21 include a messaging application configured to be able to send and receive handwriting data input with the electronic pen P. The processor 21 plays a role in activating an application in the handwriting input mode on the basis of a command generated by the AI assistant terminal 10.

Here, the messaging application is typically an e-mail application configured to be able to send and receive an e-mail. Alternatively, the messaging application may be any other type of messaging application such as an instant messenger configured to be able to send and receive a short message in real time between connected users. In the present embodiment, the description takes as an example a case where the e-mail application is used.

The memory 22, the communication unit 23, and the display 24 are hardware devices similar to the memory 12, the communication unit 13, and the display 14 of the AI assistant terminal 10, respectively.

FIG. 4 is a diagram illustrating a user table stored in the memory 22. As illustrated in the figure, this user table is a table in which each user name is associated with a corresponding pen ID (Identification). The user names in the user table are a series of user names that can be identified by the speaker recognition process performed by the AI engine. The pen ID is a predetermined number of bits of data stored in the corresponding electronic pen P in advance and has a role in identifying each electronic pen P.

Returning to FIG. 2, the sensor 25 is a position detection device configured to be able to detect the positions of the electronic pen P and the finger on a touch surface. In a typical example, the touch surface includes the display surface of the display 24. The sensor 25 is configured to periodically detect the positions of the electronic pen P and the finger on the touch surface and supply the processor 21 with the coordinates indicating the detected positions each time the positions are detected.

Although it is possible to use any of various methods such as a resistance film method, an electro-magnetic resonance method, and a capacitance method (active capacitive method) as a specific method for the sensor 25 to detect the position, the following description takes as an example a case where the capacitance method (active capacitive method) is used. According to this method, the sensor 25 can detect both the electronic pen P and a finger and send and receive a signal bidirectionally to and from the electronic pen P. Hereinafter, in this bidirectional signal transmission and reception, a signal sent from the electronic pen P will be referred to as a "downlink signal," while a signal sent from the sensor 25 will be referred to as an "uplink signal."

The uplink signal is a signal that serves to synchronize the electronic pen P with the sensor 25 and to send a command to the electronic pen P. The sensor 25 is configured to send the uplink signal periodically.

The downlink signal includes a burst signal and a data signal. The burst signal is an unmodulated signal for causing the sensor 25 to detect the position of the electronic pen P. The data signal is a signal for sending various pieces of data obtained in the electronic pen P to the sensor 25. The various pieces of data sent by the data signal include data (a writing pressure value) indicating the pressure applied to the pen tip, data indicating information regarding on/off of a switch provided on a housing, the pen ID described above, and the like.

During a period in which the electronic pen P has not yet detected the sensor 25, the electronic pen P continuously or intermittently performs the operation of receiving the uplink signal. Then, when the electronic pen P receives the uplink signal sent from the sensor 25, the electronic pen P determines a transmission/reception schedule that is synchronized with the sensor 25. After that, the electronic pen P receives the uplink signal and transmits the downlink signal according to the determined transmission/reception schedule. Further, when a command is included in the uplink signal, the electronic pen P obtains data requested by the command, includes the data in the data signal, and sends the data signal to the sensor 25. However, in order to periodically send the writing pressure value at a predetermined cycle regardless of the command, the electronic pen P appropriately includes the writing pressure value in the data signal and sends the data signal to the sensor 25.

When the sensor 25 detects the downlink signal that has been sent in response to the uplink signal from the electronic pen P that has not been detected, the sensor 25 first sends the uplink signal that includes a command requesting the pen ID to cause that electronic pen P to send the pen ID. Then, the sensor 25 obtains the pen ID from the received data signal and supplies the pen ID to the processor 21. Further, the sensor 25 periodically obtains the coordinates indicating the position of the electronic pen P from the reception strength of the burst signal sent from the electronic pen P, and also obtains the writing pressure value from the data signal sent from the electronic pen P. The sensor 25 continuously supplies these pieces of data to the processor 21.

The processor 21 is configured to control the position of a cursor displayed on a display screen of the display 24 according to the coordinates supplied from the sensor 25. Further, in a case where handwriting input with the electronic pen P is accepted, the processor 21 monitors the writing pressure value supplied from the sensor 25. When the writing pressure value becomes greater than 0 (that is, when pen-down occurs), the processor 21 starts generating stroke data indicating the trajectory of the electronic pen P. After that, while the writing pressure value remains greater than 0, the processor 21 sequentially adds the coordinates and the writing pressure value supplied one after another to the stroke data. When the writing pressure value returns to 0 (i.e., when pen-up occurs), the processor 21 ends the generation of the stroke data. After that, at a predetermined timing, the processor 21 generates a file including one or more pieces of stroke data generated up to that point (hereinafter referred to as an "ink file") and stores the ink file in the memory 22.

The configuration of each of the AI assistant terminal 10 and the tablet terminal 20 has been described in detail above. Next, the processing performed by the AI assistant terminal 10 and the tablet terminal 20 according to the present embodiment will be described in more detail with reference to FIG. 2 and their respective processing flows.

FIG. 5 is a processing flow diagram illustrating the processing performed by the processor 11 of the AI assistant terminal 10. As illustrated in the figure, the processor 11 first obtains speech input into the microphone 15 (step S1). By performing a process of recognizing the obtained speech, the processor 11 converts the speech into a character string and identifies the speaker who has uttered the speech (step S2).

Figure 6:
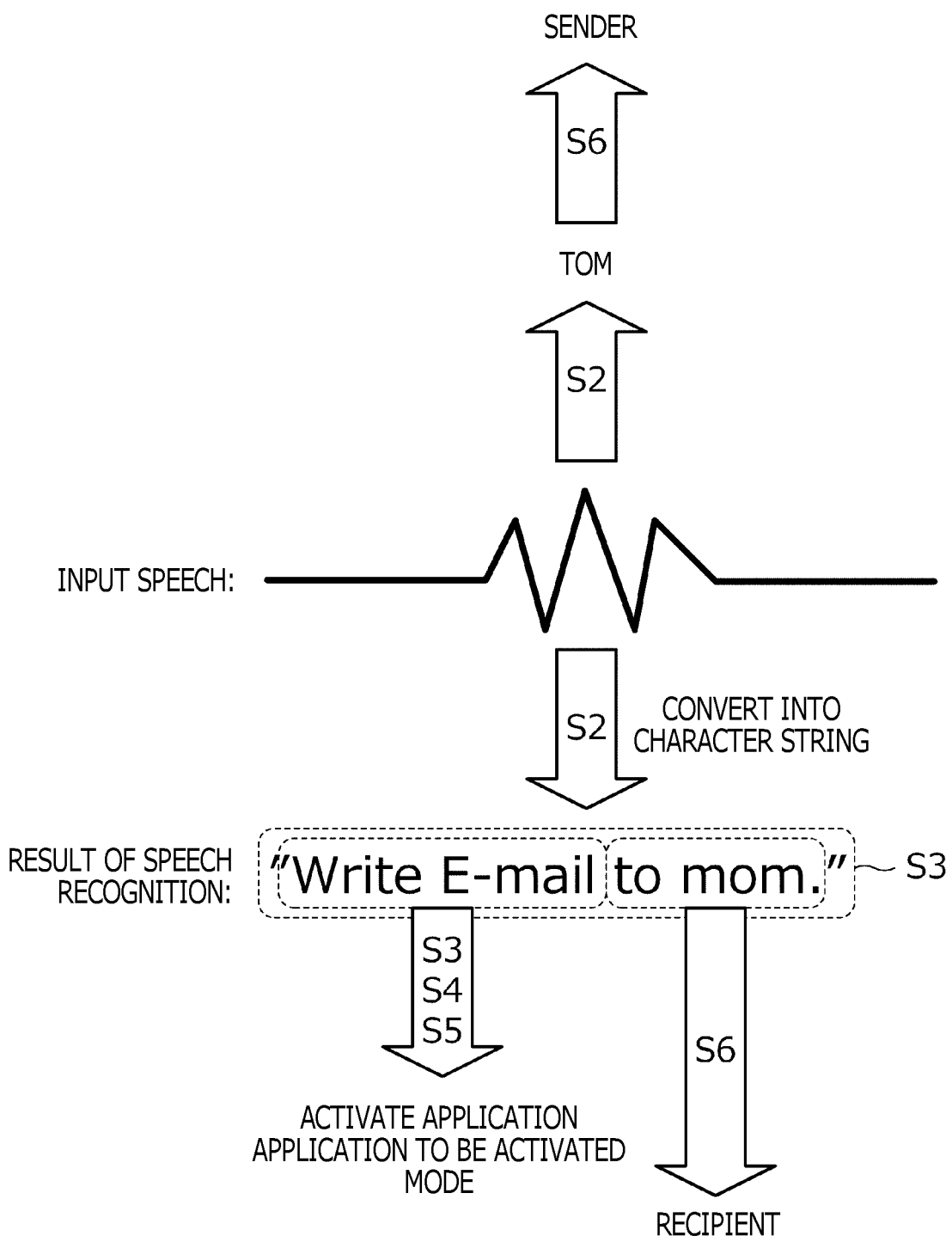
FIG. 6 is a diagram illustrating a specific example for describing the processing of the AI assistant terminal 10 illustrated in FIG. 5.

FIG. 6 is a diagram illustrating a specific example for describing the processing of the AI assistant terminal 10 illustrated in FIG. 5. As illustrated in the figure, in this example, the user utters the speech "Write E-mail to mom." By performing the predetermined recognition process with use of the AI engine described above, the processor 11 converts the above-described speech recorded by the microphone 15 into the character string "Write E-mail to mom." and identifies the speaker "Tom" who has uttered the speech (step S2).

Returning to FIG. 5, next, based on the information obtained in step S2, the processor 11 determines to activate an application (step S3) and also identifies the application to be activated (step S4). The processor 11 makes these determinations by referring to the operation contents table illustrated in FIG. 3A. In the example illustrated in FIG. 6, the character string "Write E-mail" is included in the character string obtained in step S2. Thus, the processor 11 refers to the first line of the operation contents table illustrated in FIG. 3A. Then, according to the contents of the description in the first line, the processor 11 determines to activate the application and also identifies that the application to be activated is the e-mail application.

The processor 11 further determines to activate the application identified in step S4 in the handwriting input mode on the basis of the information obtained in step S2 (step S5). In the example illustrated in FIG. 6, since none of "With pen," "Pen is unlimited," and "With keyboard" is included in the character string obtained in step S2, the processor 11 refers to the fifth line of the activation mode table illustrated in FIG. 3B. Then, according to the contents of the description in the fifth line, the processor 11 determines to activate the application in the speaker's handwriting input mode.

Next, based on the information obtained in step S2, the processor 11 identifies the data to be set in the application identified in step S4 (step S6). In the example illustrated in FIG. 6, the character string "To Mom" is included in the character string obtained in step S2. Thus, the processor 11 refers to the first line of the setting data table illustrated in FIG. 3C. Then, the processor 11 identifies "Mom" as the recipient according to the contents of the description in the first line. Further, when the speaker who has uttered the input speech has been identified in step S2, the processor 11 refers to the second line of the setting data table illustrated in FIG. 3C. Then, according to the contents of the description in the second line, the processor 11 identifies the user name of the identified speaker as the sender.

After that, the processor 11 generates a command for activating the application identified in step S4 in the handwriting input mode determined in step S5 and setting the data identified in step S6 (step S7).

Figure 7A:
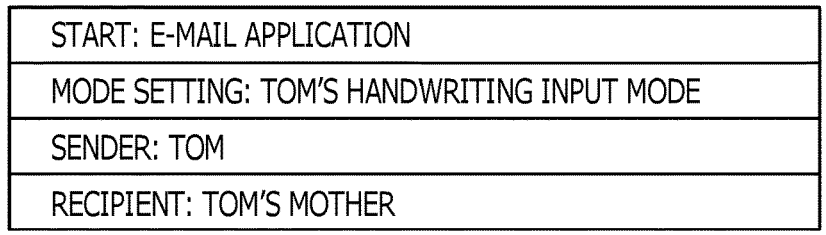

FIG. 7A is a diagram illustrating an example of the command generated in step S7 with regard to the example illustrated in FIG. 6. The command in this example includes information that identifies the application to be activated (start), information that identifies the mode of the application to be activated (mode setting), information that identifies the sender of the e-mail, and information that identifies the recipient of the e-mail. The specific contents of these pieces of information in the example in FIG. 6 are, respectively, the e-mail application, the speaker's (=Tom's) handwriting input mode, Tom, and Tom's mother.

Figure 7B:
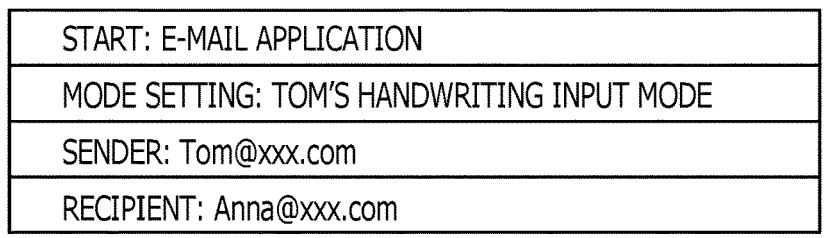
FIG. 7B is a diagram illustrating a modification of the command generated in step S7 illustrated in FIG. 5 with regard to the example illustrated in FIG. 6.

FIG. 7B is a diagram illustrating a modification of the command generated in step S7 with regard to the example illustrated in FIG. 6. In this example, the data indicating the connection between users and the e-mail address for each user are stored in advance in the memory 12 illustrated in FIG. 2. When the processor 11 identifies Tom as the sender, the processor 11 reads Tom's e-mail address "Tom@xxx.com" from the memory 12. Further, when the processor 11 identifies Tom's mother as the recipient, the processor 11 first identifies "Anna" as Tom's mother by referring to the information in the memory 12. Then, the processor 11 reads Anna's e-mail address "Anna@xxx.com" from the memory 12. After that, the processor 11 sets the two read e-mail addresses as the sender and the recipient, respectively, instead of the character strings representing "Tom" and "Tom's mother."

Returning to FIG. 5, next, the processor 11, which has generated the command in step S7, sends the generated command to the tablet terminal 20 (step S8). By the processing up to this point, the series of processes performed by the processor 11 on the basis of the input speech ends.

Figure 8:
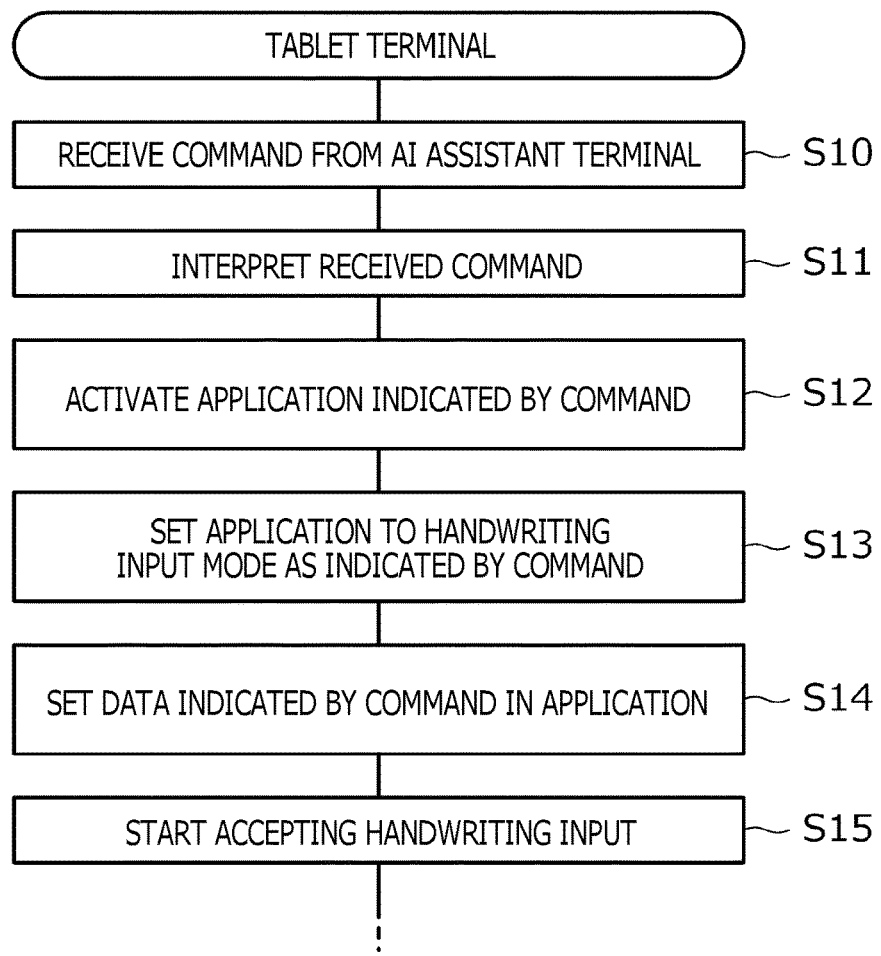
FIG. 8 is a processing flow diagram illustrating processing performed by a processor 21 of the tablet terminal 20 illustrated in FIG. 2.

FIG. 8 is a processing flow diagram illustrating processing performed by the processor 21 of the tablet terminal 20. As illustrated in the figure, the processor 21 first receives the command sent from the AI assistant terminal 10 (step S10) and interprets the command (step S11). Then, the processor 21 activates the application indicated by the command (step S12) and sets the activated application to the handwriting input mode as indicated by the command (step S13). Further, the processor 21 sets the data indicated by the command in the application (step S14) and then starts accepting handwriting input (step S15).

In this manner, with the system 1 according to the present embodiment, the application is activated in the handwriting input mode on the basis of the result of speech recognition. Therefore, the user can immediately start handwriting input by the speech command without having to set the application to the handwriting input mode by touch operation or the like each time.

Figure 9:
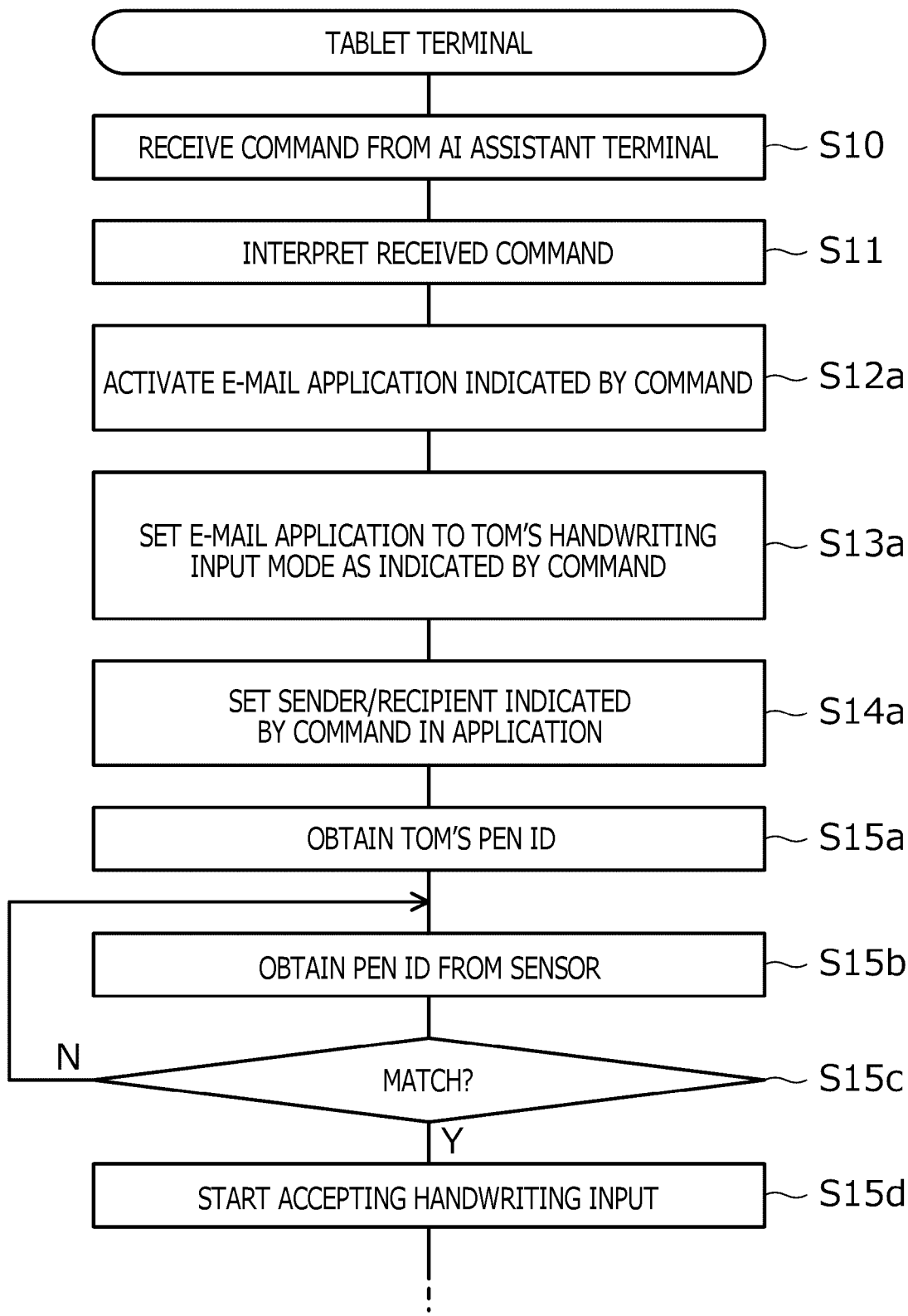
FIG. 9 is a diagram illustrating a more specific description of the processing flow diagram of FIG. 8 in a case where the command sent from the AI assistant terminal 10 has the contents illustrated in FIG. 7A.

FIG. 9 is a diagram illustrating a more specific description of the processing flow diagram of FIG. 8 in a case where the command sent from the AI assistant terminal 10 has the contents illustrated in FIG. 7A. Steps S12a to S14a illustrated in the figure respectively correspond to steps S12 to S14 of FIG. 8 and steps S15a to S15e denote the processing performed in step S15 of FIG. 8.

As illustrated in FIG. 9, in this case, the application activated in step S12 is the e-mail application (step S12a). The mode set in step S13 is the Tom's handwriting input mode (the handwriting input mode in which input means is limited to Tom's electronic pen P) (step S13a). The data set in step S14 is the sender (Tom) and the recipient (Tom's mother) indicated by the command (step S14a).

Figure 10:
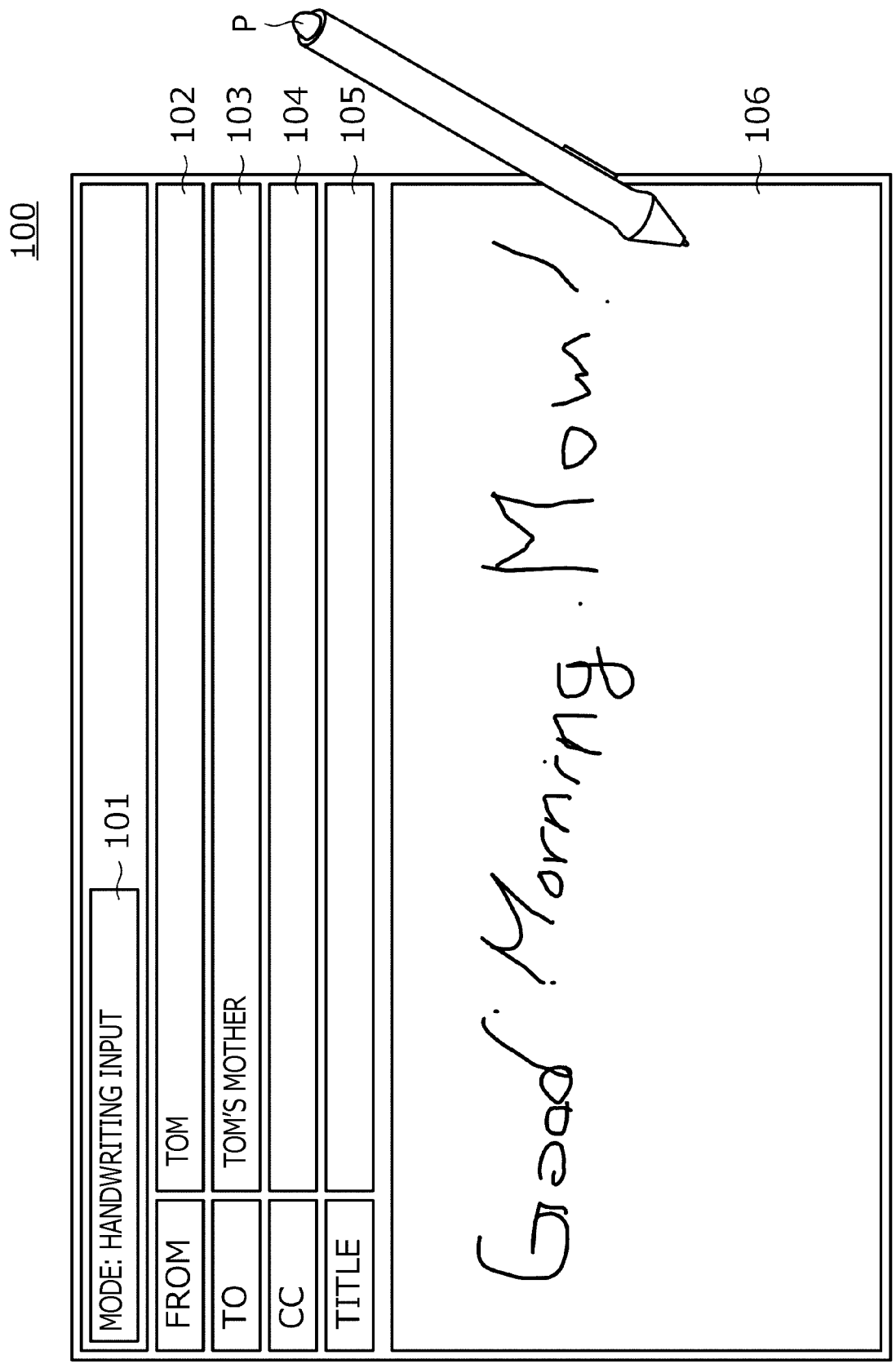
FIG. 10 is a diagram illustrating a screen 100, which is an example of a GUI (Graphical User Interface) displayed on a display surface of a display 24 by an e-mail application activated by the processing flow of FIG. 9.

FIG. 10 is a diagram illustrating a screen 100, which is an example of a GUI displayed on the display surface of the display 24 (refer to FIG. 2) by the e-mail application activated by the processing flow of FIG. 9. As illustrated in the figure, the screen 100 includes a mode display field 101, a sender selection field 102, a recipient input field 103, a carbon copy input field 104, a title input field 105, and a body input field 106.

In the mode display field 101, the processor 21 displays the mode of the e-mail application set in step S13a. Further, the processor 21 sets the sender and the recipient set in step S14a in the sender selection field 102 and the recipient input field 103, respectively. It is noted that the tablet terminal 20 has a built-in phonebook application storing user names and e-mail addresses in association with each other. The e-mail application automatically converts "Tom" and "Tom's mother," which are respectively set as the sender and the recipient, into e-mail addresses stored in the phonebook application in association with the respective user names.

The mode display field 101, the sender selection field 102, and the recipient input field 103 are all configured such that the user can change their setting contents. In this case, the mode display field 101 and the sender selection field 102 are configured to allow the user to select one of the preset options with the electronic pen P or a finger. By changing the setting contents in the mode display field 101, the user can change the mode of the e-mail application to, for example, the keyboard input mode described above. By contrast, the recipient input field 103 is configured such that the user can perform input therein using the virtual keyboard displayed by the processor 21. It is noted that the processor 21 preferably displays the virtual keyboard in response to the user touching the recipient input field 103 with the electronic pen P or a finger.

The carbon copy input field 104 and the title input field 105 are fields into which the recipient of the carbon copy of the e-mail and the title of the e-mail are input, respectively. The carbon copy input field 104 and the title input field 105 are both configured such that the user can input the recipient of the carbon copy of the e-mail and the title of the e-mail therein. As with the recipient input field 103, this input is performed by the user using the virtual keyboard.

The body input field 106 is a field into which the body of the e-mail is input and is configured such that the user can input the body of the e-mail therein. When the processor 21 sets the e-mail application to the "handwriting input mode," the body input field 106 becomes ready for input with the electronic pen P. When the processor 21 sets the e-mail application to the "keyboard input mode," the body input field 106 becomes ready for input with the keyboard.

Returning to FIG. 9, and referring to the user table illustrated in FIG. 4, the processor 21, which has set the sender and the recipient in step S14a, obtains Tom's pen ID (step S15a). Tom is the speaker who has uttered the input speech. Subsequently, the processor 21 obtains the pen ID from the sensor 25 (step S15b). The pen ID obtained in step S15b is the pen ID received by the sensor 25 as described above from the electronic pen P approaching the touch surface.

The processor 21, which has obtained the pen ID in step S15b, determines whether or not the pen ID obtained in step S15a matches the pen ID obtained in step S15b (step S15c). Then, when the processor 21 determines that these pen IDs match, the processor 21 starts accepting handwriting input (step S15d). After that, the processor 21 generates stroke data according to a series of coordinates sequentially supplied from the sensor 25 and sequentially displays the stroke data in the body input field 106. On the other hand, when the processor 21 determines in step S15c that the pen IDs do not match, the processor 21 waits until a new pen ID is supplied from the sensor 25. This allows only input with the electronic pen P owned by Tom who is the speaker of the input speech and disallows acceptance of input with another electronic pen P or a finger.

As described above, with the system 1 according to the present embodiment, the application is activated in the handwriting input mode on the basis of the result of speech recognition. Therefore, handwriting input can start by the speech command. For example, the e-mail application is activated in the handwriting input mode on the basis of the result of speech recognition. Therefore, handwriting input into the e-mail can start by the speech command.

Further, this configuration allows only input with the electronic pen P associated with the speaker who has uttered the input speech and disallows acceptance of input with another electronic pen P or a finger.

Further, this configuration can automatically set data such as the sender/recipient of an e-mail in the application to be activated, on the basis of the result of speech recognition.

It is noted that, although the application is activated in the speaker's handwriting input mode in the example according to the present embodiment, the AI assistant terminal 10 may generate a command for activating the application in the handwriting input mode on the basis of the result of speech recognition, and the tablet terminal 20 may activate, based on the command, the application in a handwriting input mode in which an electronic pen different from the electronic pen associated with the speaker can also be used for handwriting input.

Figure 11:
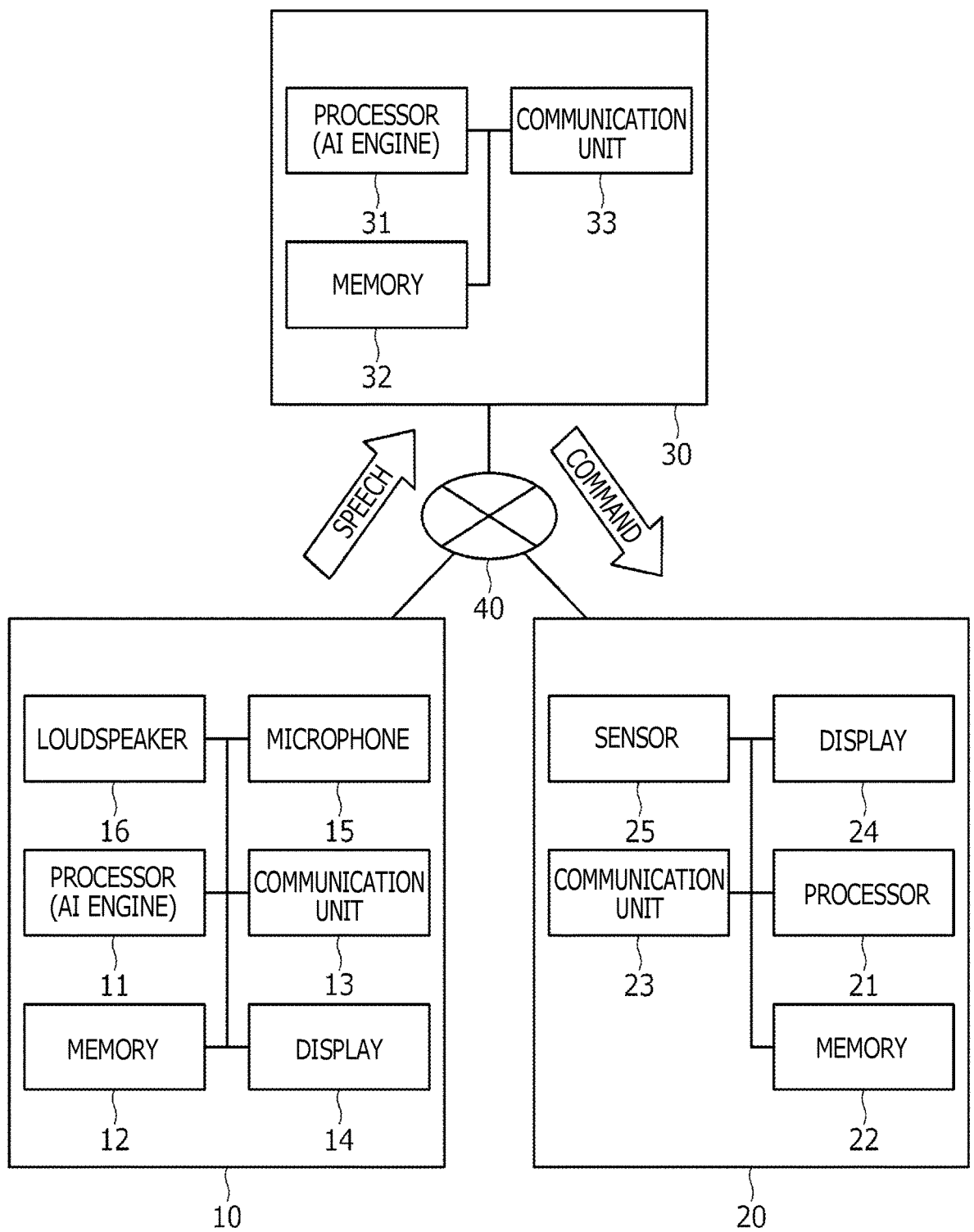
FIG. 11 is a diagram illustrating the system 1 according to a first modification of the first embodiment of the present invention.

FIG. 11 is a diagram illustrating the system 1 according to a first modification of the present embodiment. As illustrated in the figure, the system 1 according to the present modification further includes an AI server 30. Further, the AI assistant terminal 10, the tablet terminal 20, and the AI server 30 are connected to each other via a network 40. The network 40 is, for example, the Internet. The present modification is different from the present embodiment in that part of the processing performed by the AI assistant terminal 10 in the present embodiment is performed by the AI server 30 with higher processing power. The following description focuses on the differences from the present embodiment.

The AI server 30 is a server installed in, for example, a data center or the like of a company that provides speech recognition services. As illustrated in FIG. 11, the AI server 30 has a configuration in which a processor 31, a memory 32, and a communication unit 33 are connected to each other via an internal bus.

The processor 31 is a central processing unit that controls each unit of the AI server 30 and has functions of reading and executing programs stored in the memory 32. The programs executed by the processor 31 include an AI engine that performs processing related to speech input such as speech recognition.

The memory 32 is a storage device configured to be able to store various programs and pieces of data. In a typical example, the memory 32 includes a main storage device such as DDR4 SDRAM (Double Data Rate 4 Synchronous Dynamic Random Access Memory) and an auxiliary storage device such as a hard disk.

The communication unit 33 is a functional unit for communicating with other computers via a network such as the Internet or in a peer-to-peer manner. Typically, the communication unit 33 is configured to be communicable with other computers with use of the Ethernet (registered trademark) standard.

When a digital signal indicating speech is supplied from the microphone 15, the processor 11 of the AI assistant terminal 10 according to the present modification sends the digital signal to the AI server 30 in real time. The processor 31 of the AI server 30 uses the digital signal sent in real time in this manner to perform processing in steps S2 to S7 illustrated in FIG. 5. Then, the processor 31 of the AI server 30 sends the command generated in step S7 to the tablet terminal 20. The processing performed by the tablet terminal 20 that has received this command is similar to the processing in the present embodiment.

According to the present modification, relatively high-load processing such as speech recognition can be performed by the AI server 30 with high processing power. Therefore, the application can be activated in the handwriting input mode at a higher speed.

Figure 12:
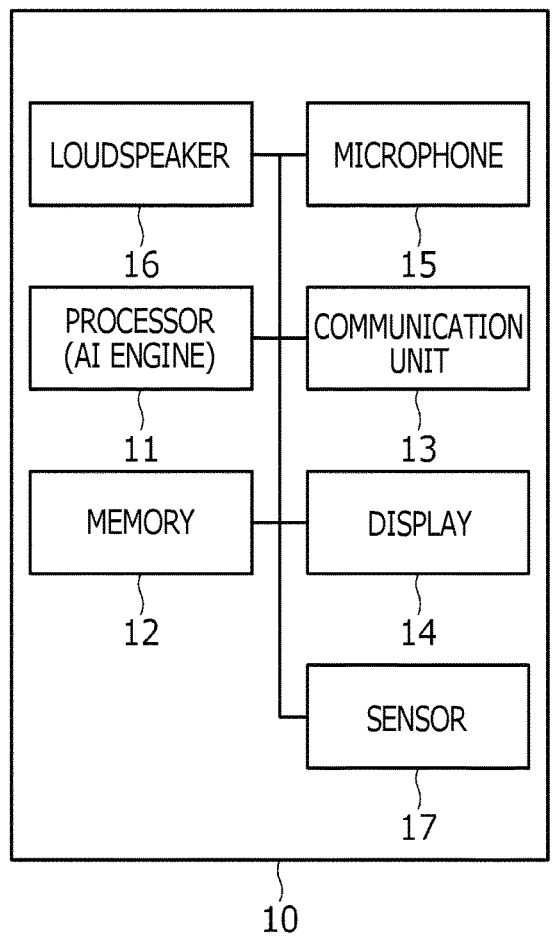
FIG. 12 is a diagram illustrating the system 1 according to a second modification of the first embodiment of the present invention.

FIG. 12 is a diagram illustrating the system 1 according to a second modification of the present embodiment. The single AI assistant terminal 10 constitutes the system 1 according to the present modification. As will be understood as compared to FIG. 2, this AI assistant terminal 10 has a configuration in which a sensor 17 is added to the AI assistant terminal 10 according to the present embodiment.

The sensor 17 is a position detection device similar to the sensor 25 illustrated in FIG. 2 and is configured to be able to detect the positions of the electronic pen P and a finger on a touch surface. In a typical example, the touch surface includes a display surface of the display 14.

The processor 11 according to the present embodiment generates a command by performing the processing in steps S1 to S7 illustrated in FIG. 5. After that, the processing in steps S1*l* to S15 illustrated in FIG. 8 is performed with respect to this command. Thus, the processing performed by the collaboration between the AI assistant terminal 10 and the tablet terminal 20 in the present embodiment is performed by the single AI assistant terminal 10 in the present modification.

According to the present modification, it is possible to input a speech command into the microphone 15 of the AI assistant terminal 10 supporting touch input with the electronic pen P and start handwriting input on the display 14 of the AI assistant terminal 10.

It is noted that, although the single AI assistant terminal 10 constitutes the system 1 in the example given in the present modification, the single tablet terminal 20 can constitute the system 1. That is, the functions of the AI assistant terminal 10 are implemented by the tablet terminal 20, thereby making it possible to input a speech command into a microphone of the tablet terminal 20 and start handwriting input on the display 24 of this tablet terminal 20.

Figure 13:
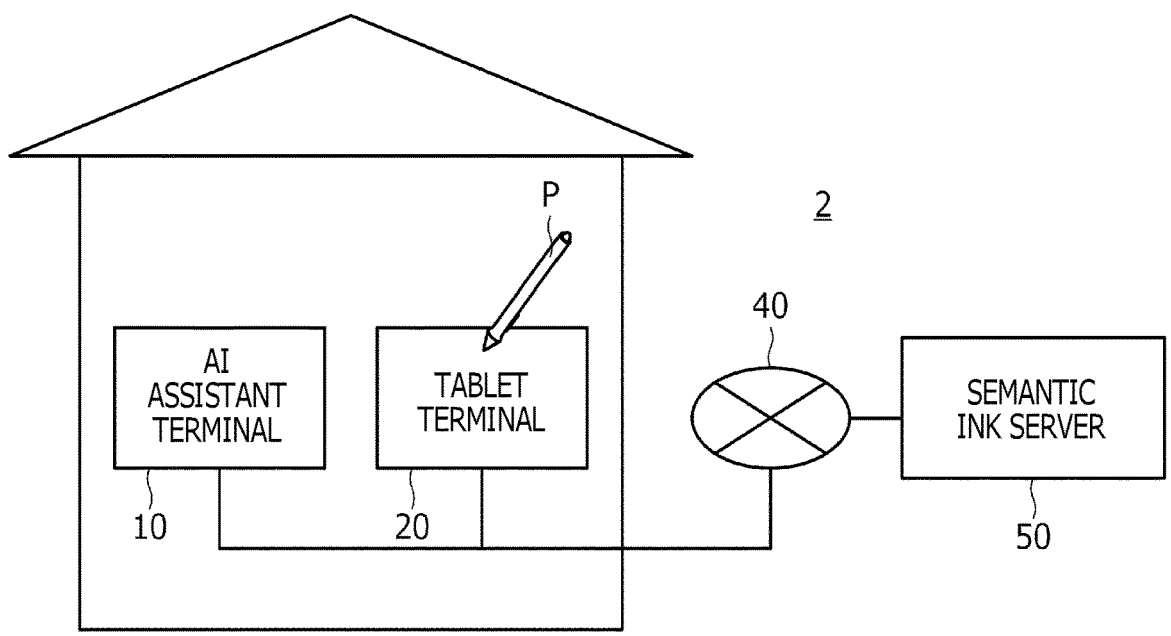
FIG. 13 is a diagram illustrating a configuration of a system 2 according to a second embodiment of the present invention.

FIG. 13 is a diagram illustrating a configuration of a system 2 according to a second embodiment of the present invention. As illustrated in the figure, the system 2 includes the AI assistant terminal 10, the tablet terminal 20, and the electronic pen P, which are, for example, installed in a home, and a semantic ink server 50, which is, for example, installed outside.

The configurations of the AI assistant terminal 10 and the tablet terminal 20 are as described in the first embodiment. The semantic ink server 50 is a server that performs semantic (semantics) analysis on the ink file described above. The AI assistant terminal 10, the tablet terminal 20, and the semantic ink server 50 are connected to each other via the network 40. The network 40 is, for example, the Internet.

Figure 14:
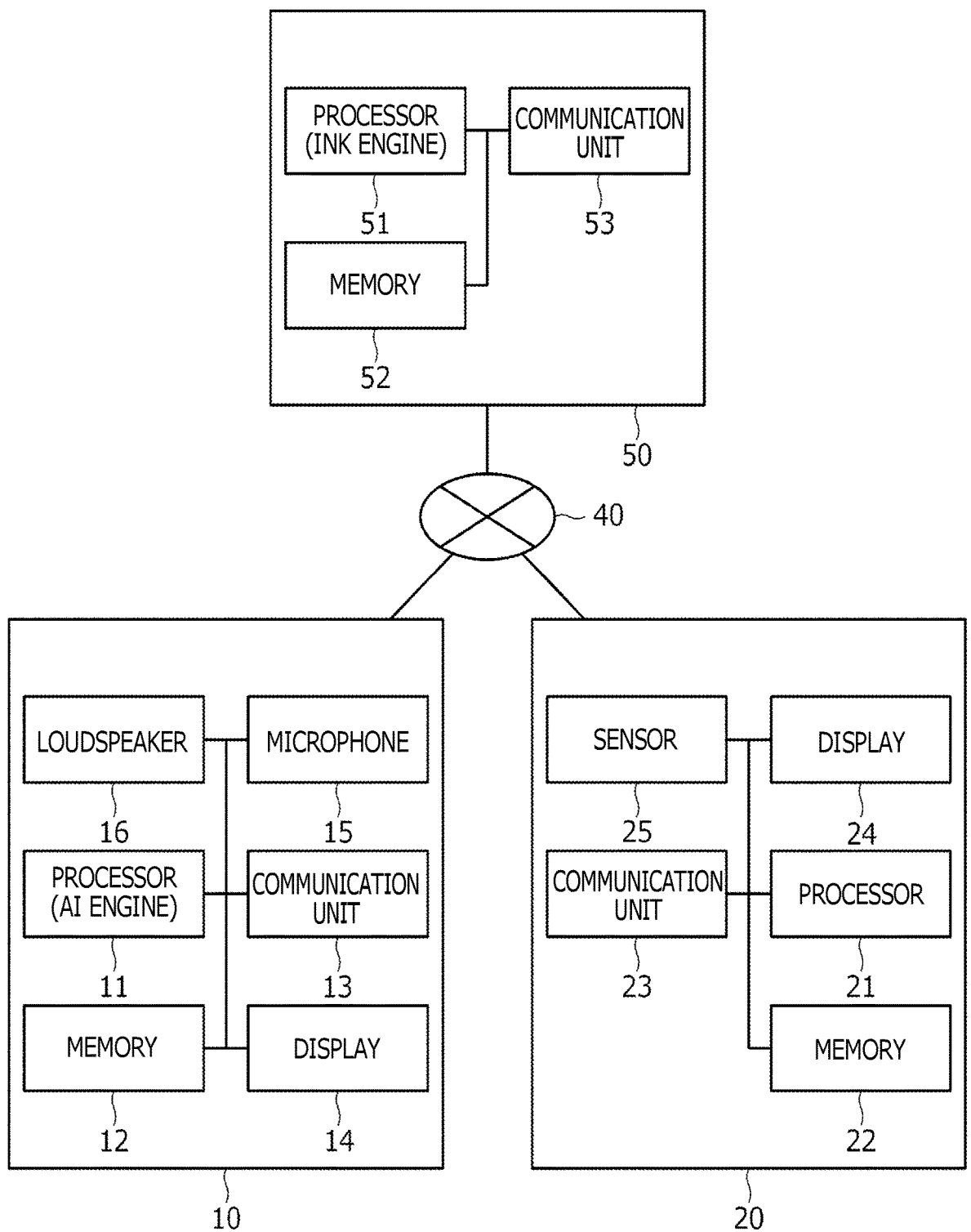
FIG. 14 is a schematic block diagram illustrating a hardware configuration of each of the AI assistant terminal 10, the tablet terminal 20, and a semantic ink server 50 illustrated in FIG. 13.

FIG. 14 is a schematic block diagram illustrating a hardware configuration of each of the AI assistant terminal 10, the tablet terminal 20, and the semantic ink server 50. Of these hardware configurations, the hardware configurations of the AI assistant terminal 10 and the tablet terminal 20 are similar to those described with reference to FIG. 2.

FIG. 15 is a diagram illustrating an ink file database stored in the memory 12 of the AI assistant terminal 10. As illustrated in the figure, the ink file database is configured to store an ink file, semantic metadata, and a pen ID in association with each other. The semantic metadata is data obtained as a result of semantic analysis on the ink file and includes purpose data indicating the purpose of the ink file. The generation of the semantic metadata will be described in detail later with reference to FIGS. 19 to 21.

FIGS. 16A and 16B are diagrams each illustrating a table stored in the memory 12 of the AI assistant terminal 10. FIG. 16A is a reproduction of FIG. 3A. FIG. 16B illustrates a presentation contents table in which speech information is associated with the type of ink file to be presented.

When the processor 11 of the AI assistant terminal 10 presents an ink file according to the table illustrated in FIG. 16A, the processor 11 determines the type of ink file to be presented by referring to FIG. 16B and presents the ink file of the determined type. For example, when a character string "Shopping List" is included in the character string obtained as a result of the speech recognition process, the processor 11 determines to present the ink file whose purpose data is "shopping list."

Additionally, in the present embodiment, the user table illustrated in FIG. 4 is also stored in the memory 12 of the AI assistant terminal 10. The processor 11 of the AI assistant terminal 10 refers to this user table in step S22 of FIG. 23 described later. The details will be described later.

Back to FIG. 14. As illustrated in FIG. 14, the semantic ink server 50 has a configuration in which a processor 51, a memory 52, and a communication unit 53 are connected to each other via an internal bus.

The processor 51 is a central processing unit that controls each unit of the semantic ink server 50 and has functions of reading and executing programs stored in the memory 32. The programs executed by the processor 51 include an ink engine that performs a character recognition process for recognizing characters from FIGS. configured by a plurality of pieces of stroke data in an ink file and also performs semantic analysis for analyzing the semantics represented by the recognized characters.

The memory 52 is a storage device configured to be able to store various programs and pieces of data. In a typical example, the memory 52 includes a main storage device such as DDR4 SDRAM as described above and an auxiliary storage device such as a hard disk.

The communication unit 53 is a functional unit for communicating with other computers via a network such as the Internet or in a peer-to-peer manner. Typically, the communication unit 53 is configured to be communicable with other computers with use of the Ethernet (registered trademark) standard.

Figure 17:
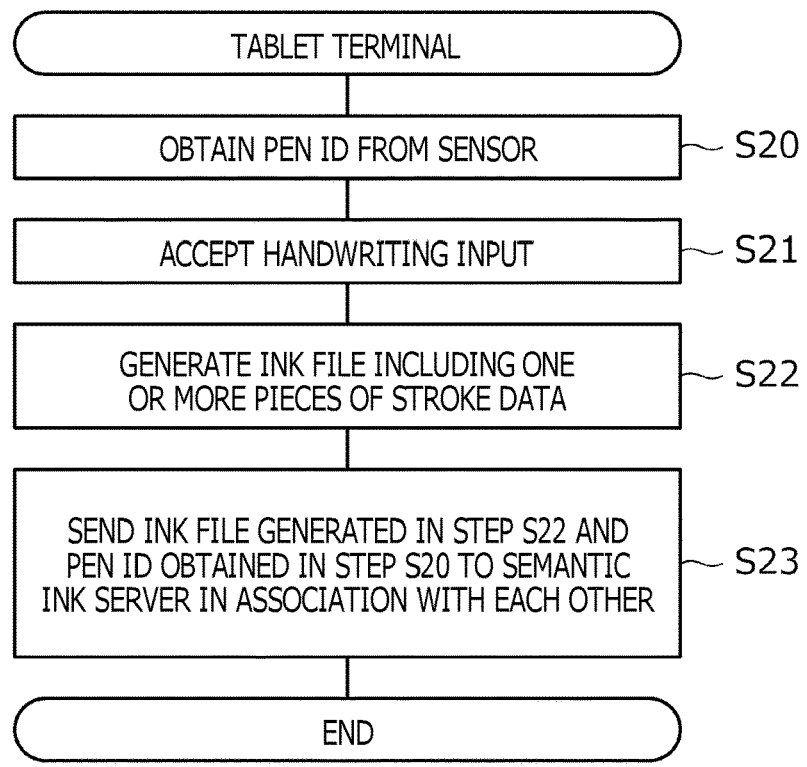
FIG. 17 is a processing flow diagram illustrating processing performed by the processor 21 of the tablet terminal 20 illustrated in FIG. 14.

FIG. 17 is a processing flow diagram illustrating processing performed by the processor 21 of the tablet terminal 20 according to the present embodiment. As illustrated in the figure, the processor 21 first obtains the pen ID from the sensor 25 (step S20). This processing is similar to the processing in step S15b of FIG. 9. Subsequently, the processor 21 accepts handwriting input (step S21). Specifically, the processor 21 generates one or more pieces of stroke data including a series of coordinates and writing pressure values each sequentially supplied from the sensor 25, as described above.

Next, the processor 21 generates an ink file including the one or more pieces of stroke data generated in step S21 (step S22). Although the ink file generated here typically includes the one or more pieces of stroke data input by the handwriting input started in step S15 illustrated in FIG. 8, the ink file may include one or more pieces of stroke data input by the handwriting input started in another procedure. After that, the processor 21 sends the generated ink file and the pen ID obtained in step S20 to the semantic ink server 50 in association with each other (step S23).

Figure 18:
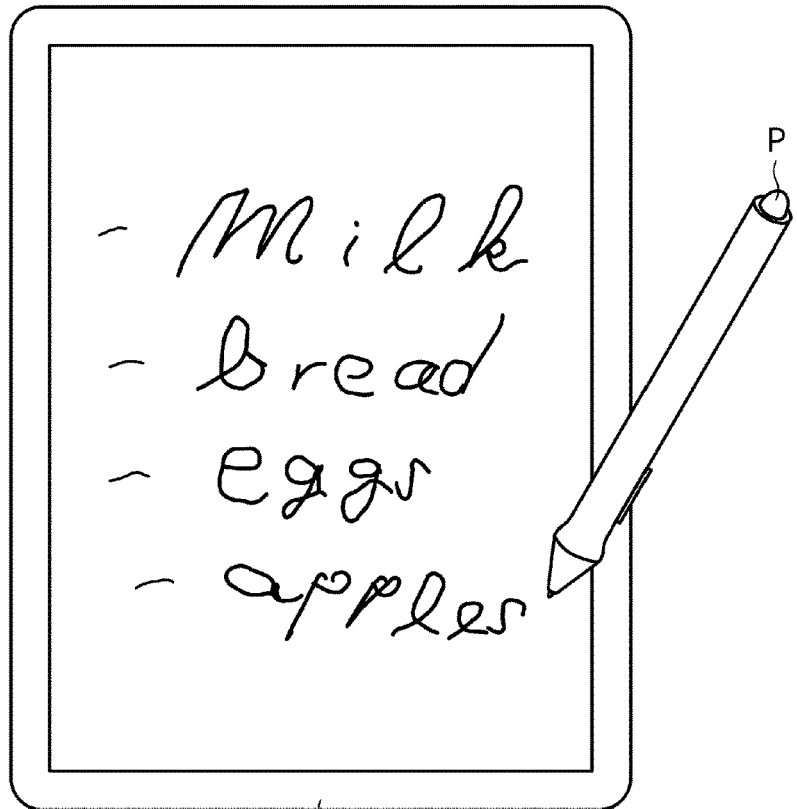
FIG. 18 is a diagram illustrating an example of a series of pieces of stroke data generated in step S21 illustrated in FIG. 17.

FIG. 18 is a diagram illustrating an example of the series of pieces of stroke data generated in step S21. In this example, each of the character strings "-milk," "-bread," "-eggs," and "-apples" is handwritten with the electronic pen P on the display surface of the tablet terminal 20. The processor 21 stores a plurality of pieces of stroke data constituting these character strings in a single ink file, associates them with the pen ID of the electronic pen P, and sends the ink file to the semantic ink server 50.

Figure 19:
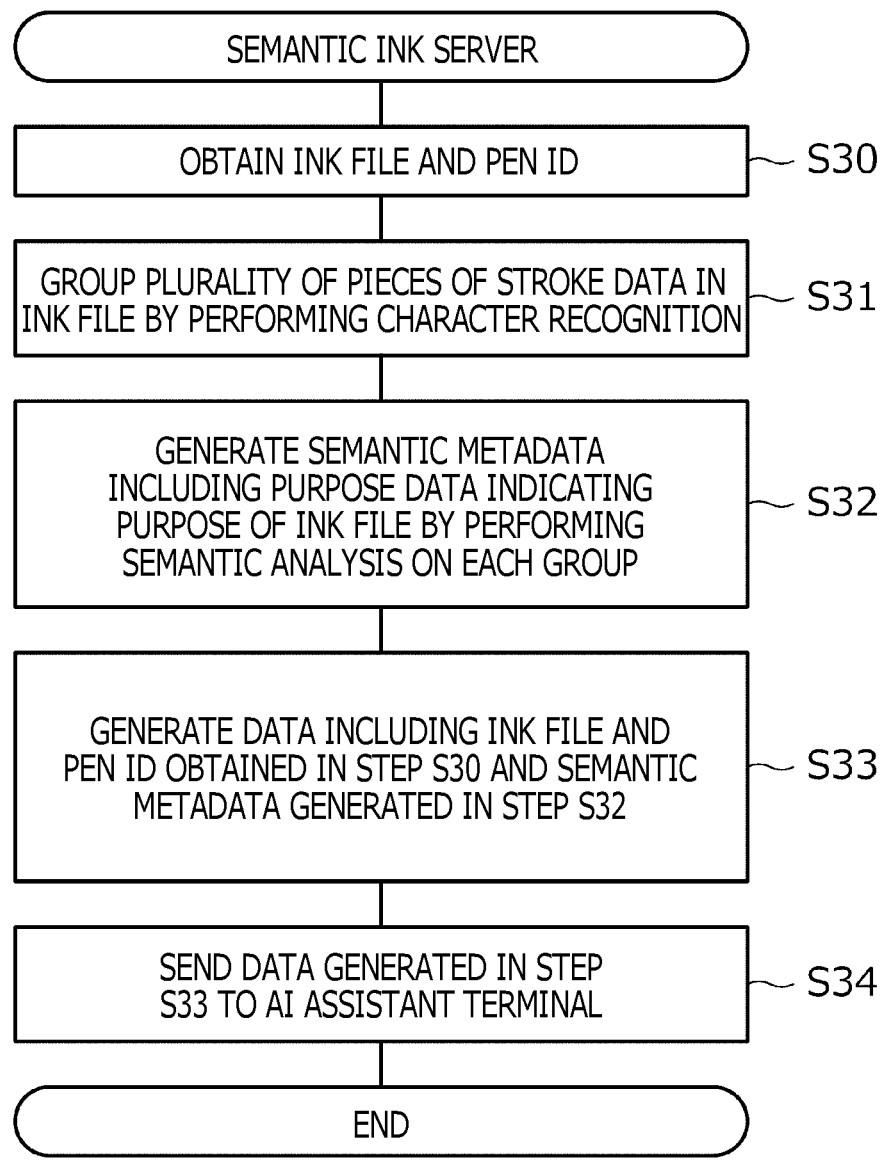
FIG. 19 is a processing flow diagram illustrating processing performed by a processor 51 of the semantic ink server 50 illustrated in FIG. 14.

FIG. 19 is a processing flow diagram illustrating processing performed by the processor 51 of the semantic ink server 50. As illustrated in the figure, the processor 51 first obtains the ink file and the pen ID sent from the tablet terminal 20 (step S30). Then, the processor 51 groups a plurality of pieces of stroke data in the ink file by performing character recognition (step S31).

Figure 20A:
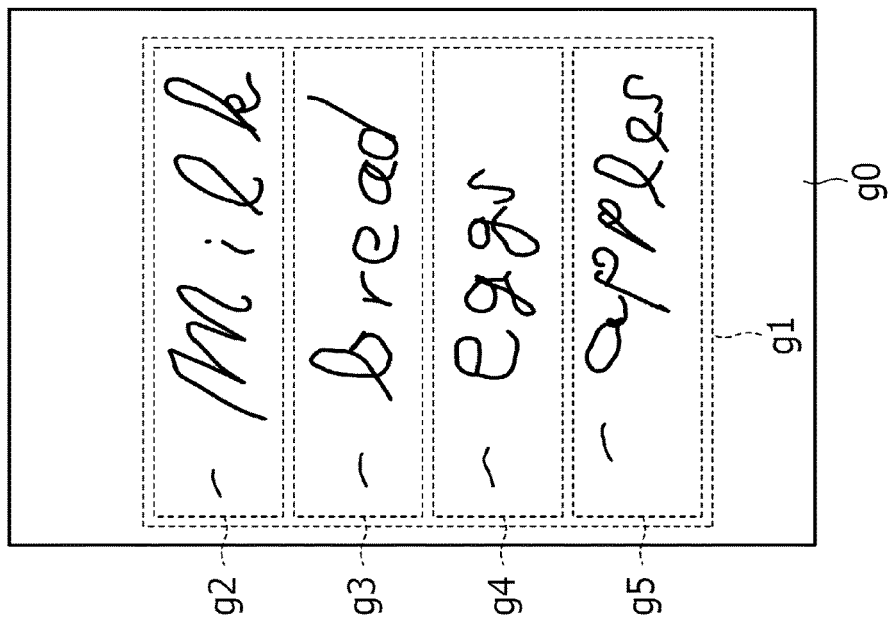
Figure 21A:
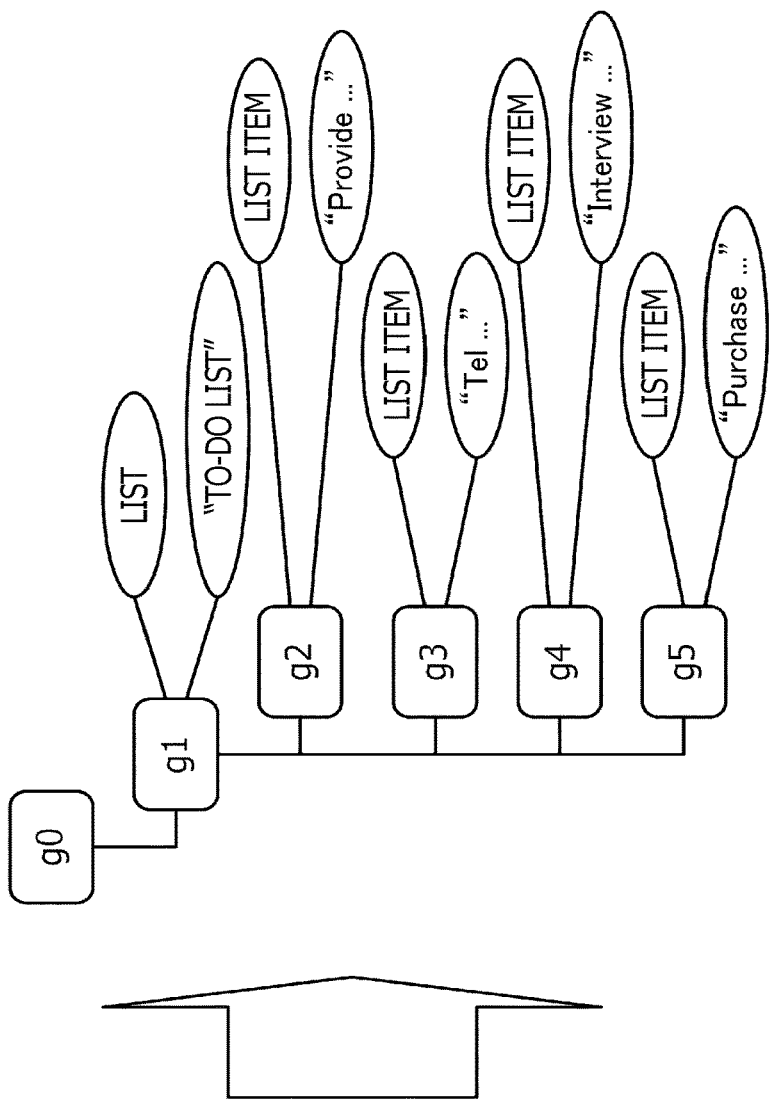

FIG. 20A is a diagram illustrating a result of grouping, in step S31, the ink file with regard to the example illustrated in FIG. 18. Further, FIG. 21A is a diagram illustrating a result of grouping, in step S31, the ink file with regard to another example. As illustrated in these figures, the processor 51 first generates a group g0 representing the entire ink file, and then generates a child group g1 in the group g0 by extracting the area including characters. Next, the processor 51 recognizes a symbol "-" and classifies each line starting with "-" into one grandchild group. In the examples illustrated in FIGS. 20A and 21A, as a result of this classification, the processor 51 generates four grandchild groups g2 to g5 in the child group g1. It is noted that, although the processor 51 refers to the symbol "-" here, the processor 51 may, needless to say, generate grandchild groups on the basis of another symbol. Regardless of what symbol is used, the user needs to know in advance the symbol to be referenced to for grouping, so that the user can intentionally generate groups.

Returning to FIG. 19, the processor 51, which has performed the grouping, next generates semantic metadata including purpose data by performing semantic analysis on each grouped stroke data. The purpose data indicates the purpose of the ink file (step S32).

Figure 20B:
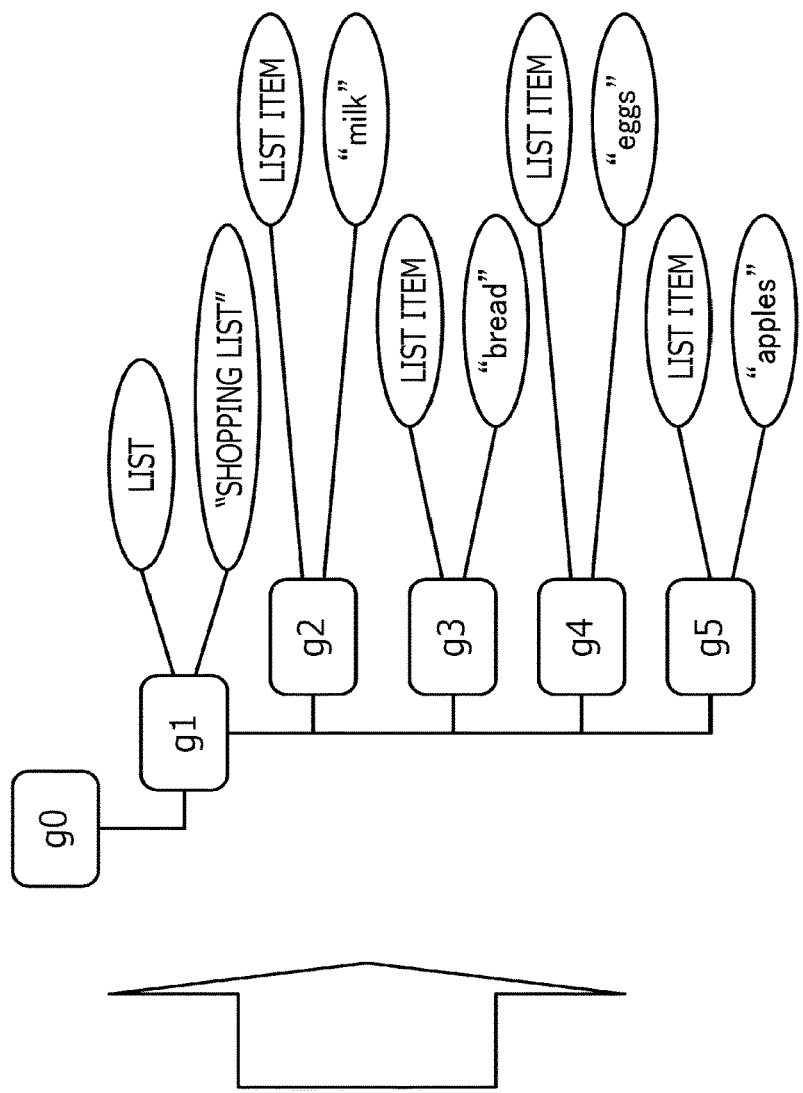
FIG. 20B is a diagram illustrating semantic metadata generated from each of the groups illustrated in FIG. 20A.
Figure 21B:
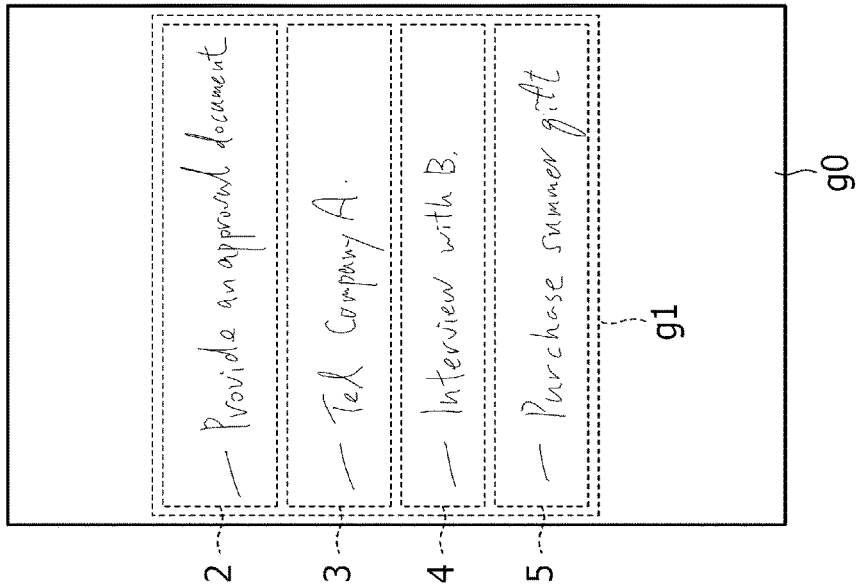
FIG. 21B is a diagram illustrating the semantic metadata generated from each of the groups illustrated in FIG. 21A.

FIG. 20B is a diagram illustrating the semantic metadata generated from each of the groups illustrated in FIG. 20A. FIG. 21B is a diagram illustrating the semantic metadata generated from each of the groups illustrated in FIG. 21A. As illustrated in these figures, the processor 51 first sets up a parent-child relation of the groups g0 to g5. Further, since the four groups g2 to g5 classified by recognizing the symbol "-" are present in the group g1, the processor 51 associates the semantics "list" with the group g1 and also associates the semantics "list item" with each of the groups g2 to g5. Moreover, the processor 51 performs the character recognition process and the semantic analysis on one or more pieces of stroke data belonging to each of the groups g2 to g5 to associate each of the words "milk," "bread," "eggs," and "apples," which are each semantic data indicating the semantics of one or more pieces of stroke data belonging to a corresponding one of the groups g2 to g5, with the corresponding one of the groups g2 to g5 in the example illustrated in FIG. 20B and associate each of the words "Provide an approval document," "Tel Company A," "Interview B," and "Purchase summer gift" with a corresponding one of the groups g2 to g5 in the example illustrated in FIG. 21B. It is noted that some descriptions are omitted in FIG. 21B due to space limitations.

By performing analysis based on the contents of the words associated with the respective groups g2 to g5 in this manner, the processor 51 further determines the purpose data indicating the purpose of the list and associates the purpose data with the group g1. In the example illustrated in FIG. 20B, "shopping list" is determined as the purpose data on the basis of the contents of the words "milk," "bread," "eggs," and "apples" and is associated with the group g1. In the example illustrated in FIG. 21B, "To-Do list" is determined as the purpose data on the basis of the contents of the words "Provide an approval document," "Tel Company A," "Interview B," and "Purchase summer gift" and is associated with the group g1.

Returning to FIG. 19, the processor 51, which has generated the semantic metadata described above, generates data including the ink file and the pen ID obtained in step S30 and the semantic metadata generated in step S32 (step S33) and sends the data to the AI assistant terminal 10 (step S34).

Figure 22:
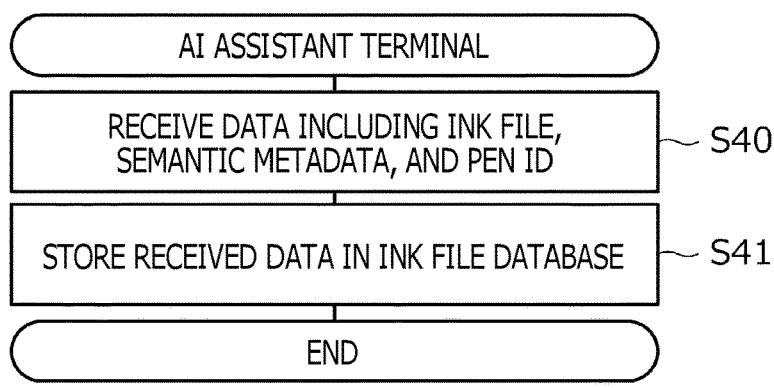
FIG. 22 is a processing flow diagram illustrating processing performed by the processor 11 of the AI assistant terminal 10 illustrated in FIG. 14.

FIG. 22 is a processing flow diagram illustrating processing performed by the processor 11 of the AI assistant terminal 10 according to the present embodiment. When the AI assistant terminal 10 receives the data sent from the semantic ink server 50 in step S34 of FIG. 19 (step S40), the AI assistant terminal 10 stores the received data in the ink file database illustrated in FIG. 15 (step S41). This allows the AI assistant terminal 10 to present the ink file in response to the speech command, as described below.

Figure 23:
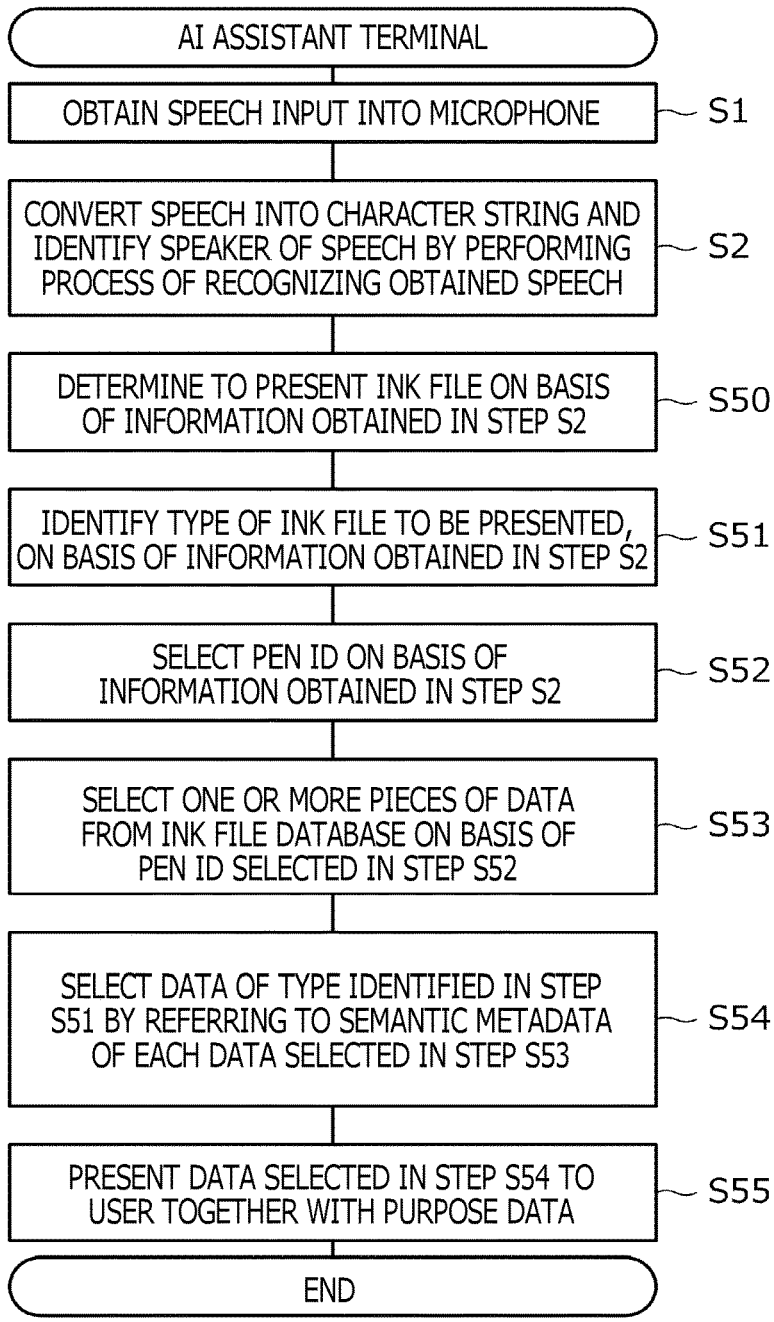
FIG. 23 is a processing flow diagram illustrating other processing performed by the processor 11 of the AI assistant terminal 10 illustrated in FIG. 14.

FIG. 23 is a processing flow diagram illustrating other processing performed by the processor 11 of the AI assistant terminal 10 according to the present embodiment. The processing illustrated in this figure is to present the ink file stored in the ink file database illustrated in FIG. 15 in response to the speech command. This processing will be described in detail below.

The processor 11 first performs steps S1 and S2 described with reference to FIG. 5.

Figure 24:
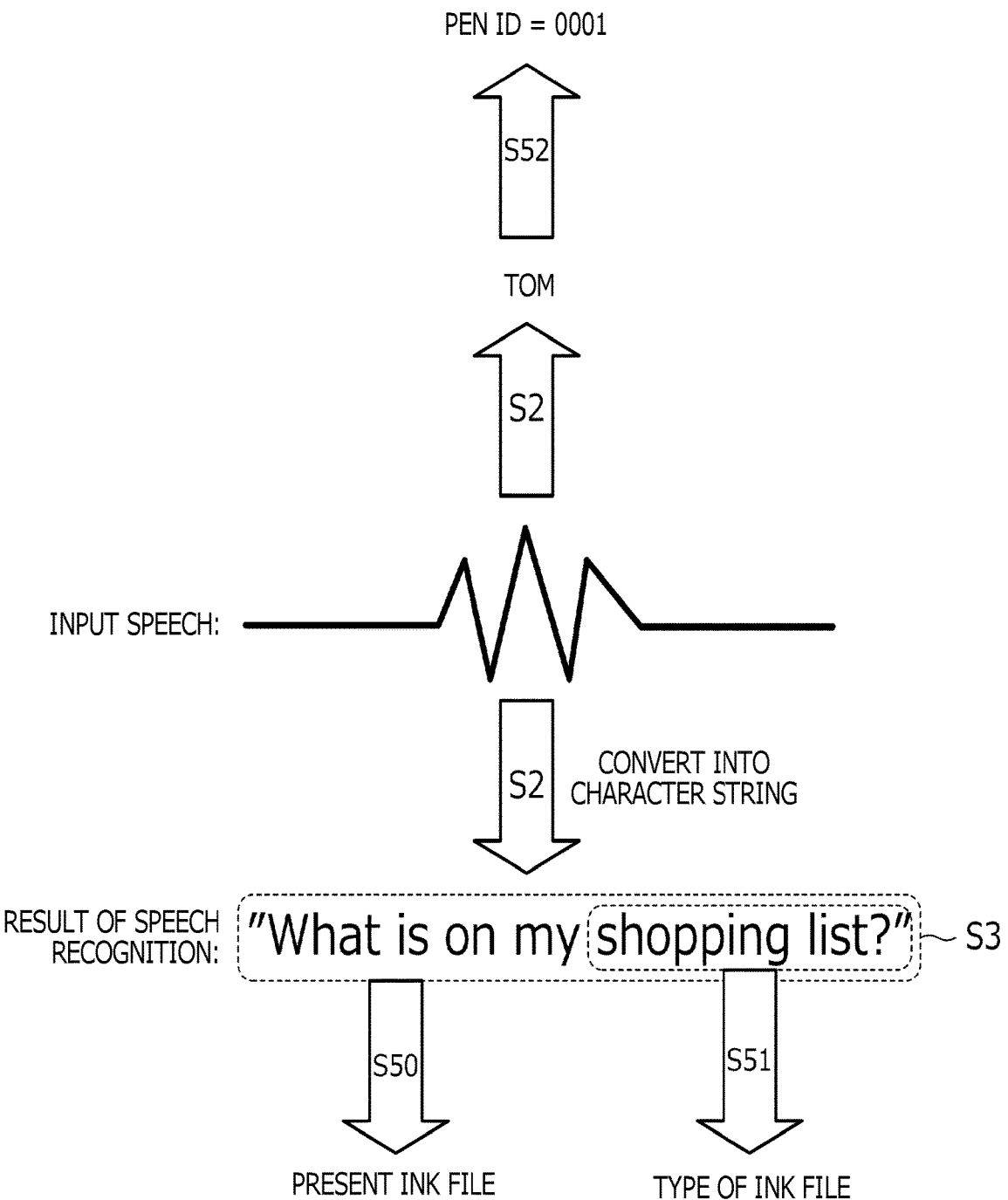
FIG. 24 is a diagram illustrating a specific example for describing the processing of the AI assistant terminal 10 illustrated in FIG. 23.

FIG. 24 is a diagram illustrating a specific example for describing the processing performed by the AI assistant terminal 10 illustrated in FIG. 23. As illustrated in the figure, in this example, the user utters the speech "What is on my shopping list?" By performing the predetermined recognition process with use of the AI engine described above, the processor 11 converts the above-described speech recorded by the microphone 15 into a character string "What is on my shopping list?" and identifies the speaker "Tom" who has uttered the speech (step S2).

Returning to FIG. 23, next, the processor 11 determines to present an ink file on the basis of the information obtained in step S2 (step S50). In the example illustrated in FIG. 24, the character string "What is on my *?" is included in the character string obtained in step S2. Thus, the processor 11 refers to the second line of the operation contents table illustrated in FIG. 16A. Then, according to the contents of the description in the second line, the processor 11 determines to present an ink file.

Subsequently, the processor 11 identifies the type of ink file to be presented, on the basis of the information obtained in step S2 (step S51). In the example illustrated in FIG. 24, the character string "shopping list" is included in the character string obtained in step S2. Thus, the processor 11 refers to the first line of the presentation contents table illustrated in FIG. 16B. Then, according to the contents of the description in the first line, the processor 11 determines to present the ink file "shopping list."

Next, the processor 11 selects the pen ID on the basis of the information obtained in step S2 (step S52). The processor 11 makes this selection by referring to the user table illustrated in FIG. 4. In the example illustrated in FIG. 24, Tom is the speaker identified in step S2 and the processor 11 selects Tom's pen ID=0001.

Subsequently, the processor 11 selects one or more pieces of data from the ink file database illustrated in FIG. 15 on the basis of the pen ID selected in step S52 (step S53). That is, among a plurality of pieces of data stored in the ink file database, the processor 11 selects any data stored in association with the pen ID selected in step S52. For example, in the example illustrated in FIG. 15, when the pen ID selected in step S52 is "0001," the processor 11 selects the data associated with an ink file 01 and the data associated with an ink file 03.

The processor 11 further selects the data of the type identified in step S51 by referring to the semantic metadata of each data selected in step S53 (step S54). That is, among each data selected in step S53, the processor 11 selects the data stored in the ink file database in association with the purpose data corresponding to the type identified in step S51. In the example illustrated in FIG. 24, since the type of ink file identified in step S51 is the shopping list as described above, the processor 11 selects the data whose purpose data described above is "shopping list" in the semantic metadata from among each data selected in step S53.

Finally, the processor 11 presents the data selected in step S54 to the user together with the purpose data (step S55). The information presented here may be the ink file itself, that is, one or more pieces of stroke data, or may be semantic metadata, that is, the purpose data or the semantic data of the stroke data. Further, as a presentation method, the information may be displayed on the display 14 illustrated in FIG. 14 or the semantic metadata may be output by speech from the loudspeaker 16 illustrated in FIG. 14 by using text-to-speech software.

Figure 25:
FIG. 25 is a diagram illustrating an example of displaying the ink file on a display 14 with regard to the example illustrated in FIG. 20.
Figure 26:
FIG. 26 is a diagram illustrating an example of displaying an alternative list configured based on the semantic metadata on the display 14 with regard to the example illustrated in FIG. 20.

FIG. 25 is a diagram illustrating an example of displaying the ink file on the display 14 with regard to the example illustrated in FIG. 20. FIG. 26 is a diagram illustrating an example of displaying an alternative list configured based on the semantic metadata on the display 14 with regard to the example illustrated in FIG. 20. In the example illustrated in FIG. 25, the contents of the user's handwriting itself are displayed. Therefore, the contents written by the user can be reliably presented to the user. By contrast, in the example illustrated in FIG. 26, the list is displayed in print. Therefore, the ink file can be presented in an easy-to-read format for the user. It is noted that the word "shopping list" depicted in the upper part of each figure indicates the purpose data presented together with the data selected in step S54.

As described above, with the system 2 according to the present embodiment, the ink file generated by handwriting input can be searched for by using the purpose of the ink file ("shopping list," "To-Do list," or the like), which is automatically assigned by the semantic analysis, as a search key. This configuration can, therefore, facilitate the search of the ink file.

Further, with the system 2 according to the present embodiment, the ink file can be searched for by the utterance of the purpose of the ink file ("shopping list," "To-Do list," or the like).

Figure 27:
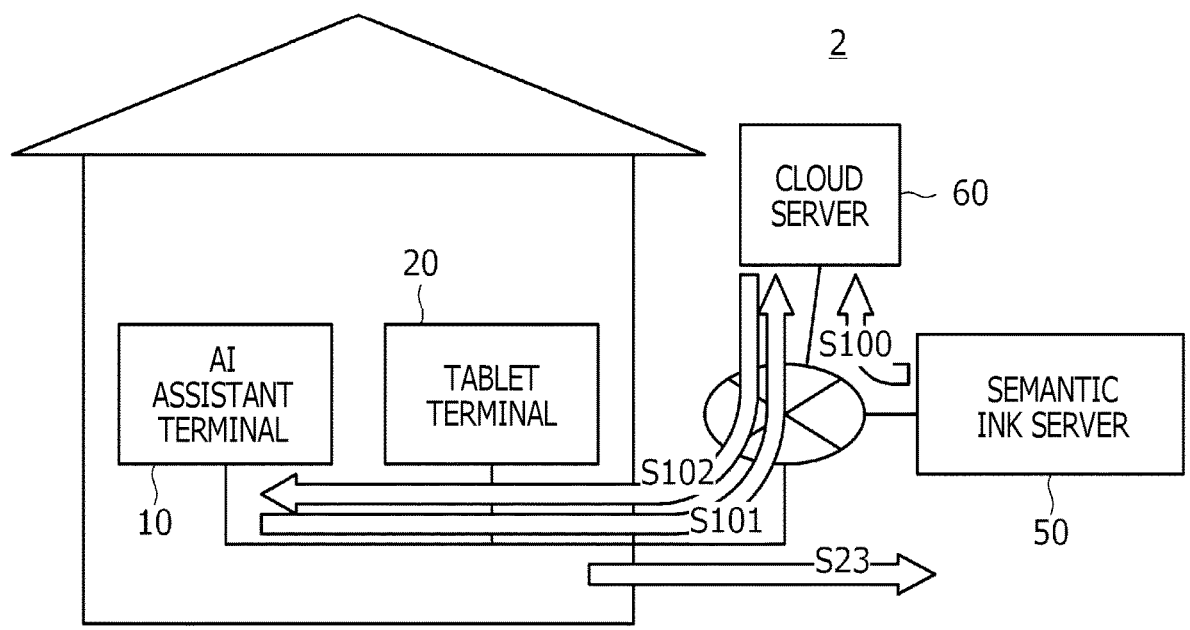
FIG. 27 is a diagram illustrating the system 2 according to a modification of the second embodiment of the present invention.

FIG. 27 is a diagram illustrating the system 2 according to a modification of the present embodiment. As illustrated in the figure, the system 1 according to the present modification further includes a cloud server 60. The present modification is different from the present embodiment in that the ink file database illustrated in FIG. 15 is constructed in the cloud server 60 instead of the AI assistant terminal 10. The following description focuses on the differences from the present embodiment.

The semantic ink server 50 according to the present modification performs a process of sending the data generated in step S33 of FIG. 19 to the cloud server 60 instead of step S34 of FIG. 19 (step S100). The cloud server 60, which has received the data sent in this manner, internally performs processing similar to the processing of the AI assistant terminal 10 illustrated in FIG. 22. Accordingly, the ink file database illustrated in FIG. 15 is constructed in the cloud server 60.

Instead of steps S53 and S54 illustrated in FIG. 23, the AI assistant terminal 10 according to the present modification sends a command (e.g., SQL (Structured Query Language) command) including the pen ID selected in step S52 and the type of ink file identified in step S51 to the cloud server 60 (step S101). The cloud server 60, which has received this command, selects one or more pieces of data from the ink file database on the basis of the received pen ID, and further selects the data of the received type from among each selected data by referring to the semantic metadata of each selected data. Then, the cloud server 60 returns the finally selected data to the AI assistant terminal 10 (step S102). The AI assistant terminal 10, which has received the returned data in this manner, performs the processing of step S55 illustrated in FIG. 23.

According to the present modification, the ink file database is constructed in the cloud server 60. With this configuration, for example, ink files generated by each of a plurality of tablet terminals 20 owned by a company can be stored in a single ink file database, and the plurality of ink files stored in this ink file database can be searched for from a plurality of AI assistant terminals 10 owned by the same company.

Although the preferred embodiments of the present invention have been described above, the present invention is by no means limited to the above-described embodiments. As a matter of course, the present invention can be implemented in various modes without departing from the scope of the present invention.

For example, the character strings (such as "Write E-mail") used in each of the above-described embodiments are merely examples, and, needless to say, other character strings may be used.

Further, in each of the above-described embodiments, the processor 11 of the AI assistant terminal 10 determines the contents of the operation to be activated and the like by comparing the character string obtained by the speech recognition process with the character string described in the "speech information" field illustrated in FIGS. 3A to 3C or FIGS. 16A and 16B. Alternatively, in the speech recognition process, the processor 11 may determine the contents of the operation to be activated and the like by comparing the input speech with the speech obtained by the utterance of the character string described in the "speech information" field illustrated in FIGS. 3A to 3C or FIGS. 16A and 16B on a speech basis.

The present invention can have the following configurations. According to these configurations, it is possible to provide a system that uses an AI assistant to enable handwriting input.

[Claim 1] A system configured to generate a command for activating an application in a handwriting input mode by recognizing speech input through a microphone, and activate the application in the handwriting input mode on the basis of the generated command.

[Claim 2] The system according to claim 1,
in which the system identifies a speaker who has uttered the speech by recognizing the speech and allows, in the handwriting input mode, input with an electronic pen associated with the identified speaker.

[Claim 3] The system according to claim 1,
in which the application is a messaging application configured to be able to send handwriting data input with the electronic pen.

[Claim 4] The system according to claim 3,
in which the system identifies a speaker who has uttered the speech by recognizing the speech and sets the speaker as a sender of the handwriting data.

[Claim 5] The system according to claim 3,
in which the system identifies a recipient of the handwriting data by recognizing the speech and sets the recipient as a destination of the handwriting data.

[Claim 6] The system according to claim 1, further including:
a first table in which speech information corresponding to a result of a speech recognition process is associated with the application to be activated,
wherein the system determines the application to be activated on the basis of information obtained by recognizing the speech and the speech information stored in the first table.

[Claim 7] The system according to claim 6, further including:
a second table in which speech information corresponding to a result of the speech recognition process is associated with an activation mode of the application to be activated,
wherein the system determines the activation mode of the application to be activated on the basis of information obtained by recognizing the speech and the speech information stored in the second table.

[Claim 8] The system according to claim 7, further including:
a third table in which speech information corresponding to a result of the speech recognition process is associated with setting data used in a case where the application to be activated is activated,
wherein the system identifies data to be set in the application to be activated on the basis of information obtained by recognizing the speech or a speaker who has uttered the speech obtained by recognizing the speech and the speech information stored in the third table.

[Claim 9] The system according to claim 2, further including:
a fourth table in which a user name is associated with a pen ID,
wherein, in the handwriting input mode, the system allows input with the electronic pen having the pen ID that is stored in the fourth table in association with the identified speaker.

[Claim 10] The system according to claim 9, further including:
a sensor configured to detect a position of the electronic pen and receive the pen ID from the electronic pen,
wherein, in the handwriting input mode, the system allows input with the electronic pen whose pen ID associated with the identified speaker in the fourth table matches the pen ID received by the sensor.

DESCRIPTION OF REFERENCE SYMBOLS 1, 2: System
10: AI assistant terminal
11, 21, 31, 51: Processor
12, 22, 32, 52: Memory
13, 23, 33, 53: Communication unit 14, 24: Display
15: Microphone
16: Loudspeaker
17, 25: Sensor
20: Tablet terminal
30: AI server
40: Network
50: Semantic ink server
60: Cloud server
100: Screen
101: Mode display field
102: Sender selection field
103: Recipient input field
104: Carbon copy input field
105: Title input field
106: Body input field
g0 to g5: Group

The invention claimed is:

1. A system configured to allow storage and retrieval of handwriting input, comprising:
   a processor,
   a sensor configured to receive touch input; and
   a non-transitory memory including instructions which, when executed by the processor, cause the processor to:
   generate stroke data in response to handwriting input received via the sensor,
   generate, by performing semantic analysis on the stroke data, semantic metadata including semantic data indicating semantics of the stroke data and purpose data determined based on the semantic data, wherein the purpose data indicates a use purpose of the stroke data,
   store the stroke data, the semantic metadata, and a pen identification indicating an electronic pen used to generate the stroke data in association with each other, and
   in response to a user prompt indicative of the pen identification, retrieve the stroke data and the semantic metadata corresponding to the pen identification.

2. The system according to claim 1, further comprising:
   a microphone,
   wherein, by recognizing speech input through the microphone, the processor selects the stroke data or the semantic data associated with the purpose data corresponding to the recognized speech.

3. The system according to claim 1, further comprising:
   a microphone,
   wherein, by recognizing speech input through the microphone, the processor selects the stroke data or the semantic data associated with the purpose data corresponding to the recognized speech, and
   the system further includes a loudspeaker configured to output, by speech, the stroke data or the semantic data that has been selected.

4. The system according to claim 1, comprising:
   a microphone,
   wherein the processor obtains, by recognizing speech input through the microphone, the pen identification assigned to the electronic pen of a speaker who has uttered the speech and selects the stroke data or the semantic data associated with the obtained pen identification, and
   the system is configured to display the stroke data or the semantic data that has been selected.

5. The system according to claim 4, wherein the processor obtains the pen identification assigned to the electronic pen of the speaker by obtaining the pen identification stored in association with a user identification of the speaker in a user table that stores a user name and the pen identification in association with each other.

6. The system according to claim 1, wherein the processor groups the stroke data and performs the semantic analysis on the grouped stroke data.

7. A stroke data processing method comprising:
   generating stroke data in response to handwriting input received via a sensor;
   generating, by performing semantic analysis on the generated stroke data, semantic metadata including semantic data indicating semantics of the stroke data and purpose data determined based on the semantic data, wherein the purpose data indicates a use purpose of the ink file;
   storing, in a non-transitory memory, the stroke data, the semantic metadata, and a pen identification indicating an electronic pen used to generate the stroke data in association with each other; and
   in response to a user prompt indicative of the pen identification, retrieving the stroke data and the semantic metadata corresponding to the pen identification.

8. The stroke data processing method according to claim 7, further comprising:
   recognizing speech input through a microphone; and
   displaying the stroke data or the semantic data associated with the purpose data corresponding to the recognized speech on a display.

9. The stroke data processing method according to claim 7, further comprising:
   recognizing speech input through a microphone; and
   outputting, by speech, the stroke data or the semantic data associated with the purpose data corresponding to the recognized speech from a loudspeaker.

10. The stroke data processing method according to claim 7, further comprising:
    by recognizing speech input through a microphone, obtaining the pen identification assigned to the electronic pen of a speaker who has uttered the speech; and
    displaying the stroke data or the semantic data associated with the obtained pen identification on a display.

11. The stroke data processing method according to claim 10, further comprising:
    obtaining the pen identification assigned to the electronic pen of the speaker by obtaining the pen identification stored in association with a user identification of the speaker in a user table that stores a user name and the pen identification in association with each other.

12. The stroke data processing method according to claim 7, further comprising:
    performing the semantic analysis on the stroke data that has been grouped.

* * * * *